US009137392B2

(12) United States Patent
Okamoto

(10) Patent No.: US 9,137,392 B2
(45) Date of Patent: Sep. 15, 2015

(54) FACSIMILE DEVICE TRANSFERRING FACSIMILE DATA TO DIFFERENT DEVICE

(71) Applicant: KYOCERA Document Solutions Inc., Osaka (JP)

(72) Inventor: Kentaro Okamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/341,619

(22) Filed: Jul. 25, 2014

(65) Prior Publication Data

US 2015/0029538 A1  Jan. 29, 2015

(30) Foreign Application Priority Data

| Jul. 29, 2013 | (JP) | 2013-156516 |
| Jul. 29, 2013 | (JP) | 2013-156517 |
| Jul. 31, 2013 | (JP) | 2013-159945 |
| Jul. 31, 2013 | (JP) | 2013-159946 |

(51) Int. Cl.
*G06F 3/12* (2006.01)
*H04N 1/00* (2006.01)

(52) U.S. Cl.
CPC .................. *H04N 1/00206* (2013.01)

(58) Field of Classification Search
None
See application file for complete search history.

(56) References Cited

U.S. PATENT DOCUMENTS

| 5,521,719 A * | 5/1996 | Yamada .................. 358/438 |
| 5,552,901 A * | 9/1996 | Kikuchi et al. ............. 358/468 |
| 6,515,757 B1 * | 2/2003 | Matsuo et al. ............. 358/1.15 |
| 8,164,764 B2 * | 4/2012 | Fujiwara et al. ............ 358/1.13 |
| 2003/0117665 A1 * | 6/2003 | Eguchi et al. .............. 358/402 |
| 2003/0174177 A1 * | 9/2003 | Tsukuda et al. ........... 345/810 |
| 2004/0205115 A1 * | 10/2004 | Young et al. ............... 709/203 |
| 2005/0046880 A1 * | 3/2005 | Asai et al. ................. 358/1.6 |
| 2005/0088686 A1 * | 4/2005 | Tanimoto .................. 358/1.15 |
| 2008/0007789 A1 * | 1/2008 | La ............................ 358/400 |
| 2008/0130040 A1 * | 6/2008 | Henry et al. ............... 358/1.15 |
| 2009/0295540 A1 * | 12/2009 | Yamamoto ............... 340/5.85 |
| 2011/0069356 A1 * | 3/2011 | Yoshida ..................... 358/442 |
| 2012/0206757 A1 * | 8/2012 | Kawabata .................. 358/1.14 |

FOREIGN PATENT DOCUMENTS

| JP | H09-065035 A | 3/1997 |
| JP | 2009-182652 A | 8/2009 |

* cited by examiner

*Primary Examiner* — Ming Hon
(74) *Attorney, Agent, or Firm* — Knobbe, Martens, Olson & Bear LLP

(57) ABSTRACT

A multifunction peripheral includes: a facsimile communication section, an image memory, a job management section, a transfer instruction reception section, a password creation section, a data transfer control section, and a delete instruction reception section. When the delete instruction reception section has received a delete instruction, the job management section compares a password indicated by the delete instruction with a password created in correspondence with facsimile data of a fax job targeted for deletion by the delete instruction, and deletes the fax job indicated by the delete instruction under condition that the passwords agree with each other.

3 Claims, 33 Drawing Sheets

Fig.19

THIS IS STATUS CHECK/JOB CANCEL SCREEN　　　　10:19　　d13

SUBSTITUTE PRINTING-TRANSFER_TRANSMITTED DESTINATION

FAX
06-○○○-××××

PRINTER E

PERSONAL COMPUTER E

PERSONAL COMPUTER D

◁ 1/5 ▷

DETAILS　　CLOSE　　OK

STATUS　TONER EMPTY

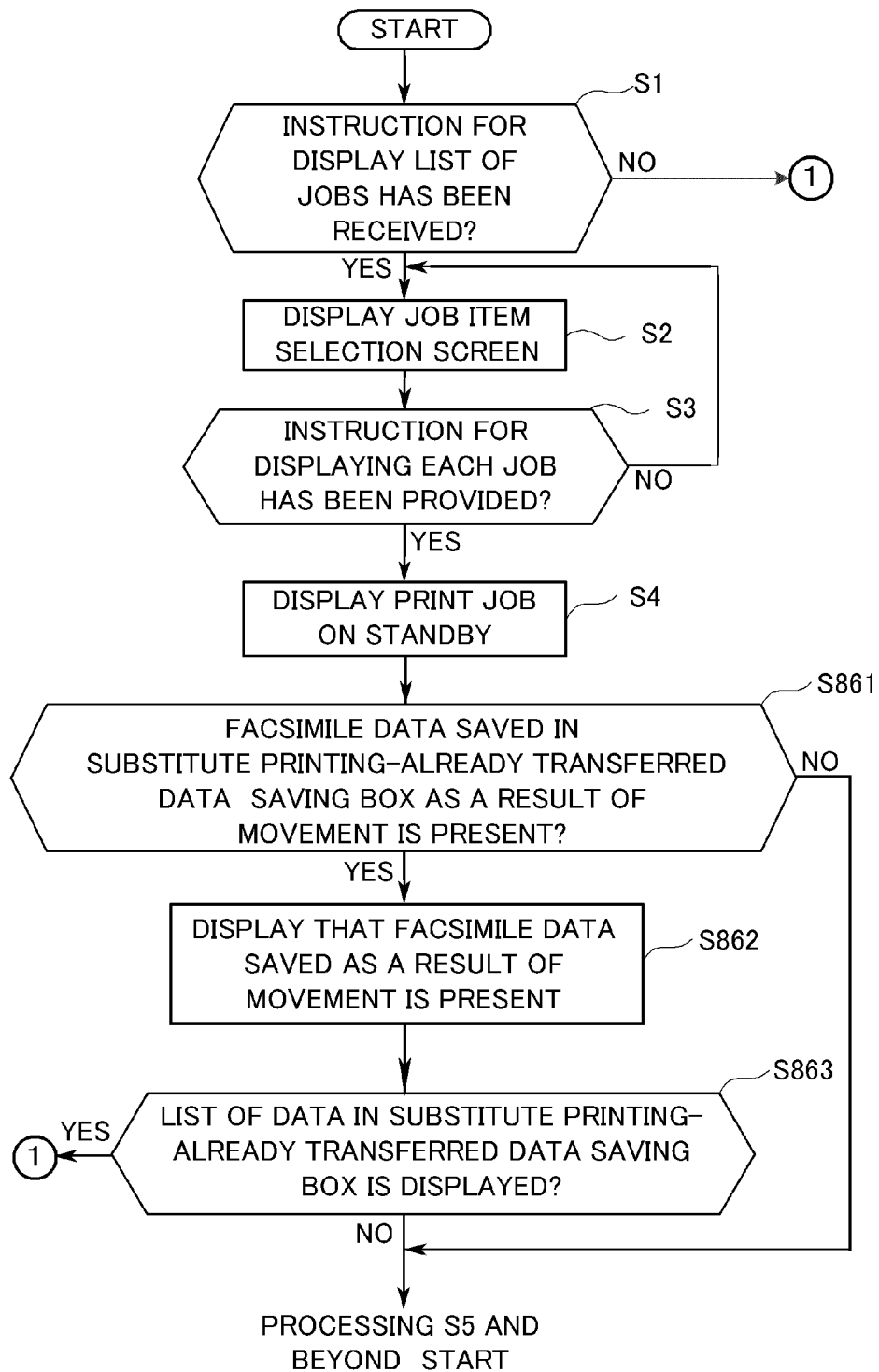

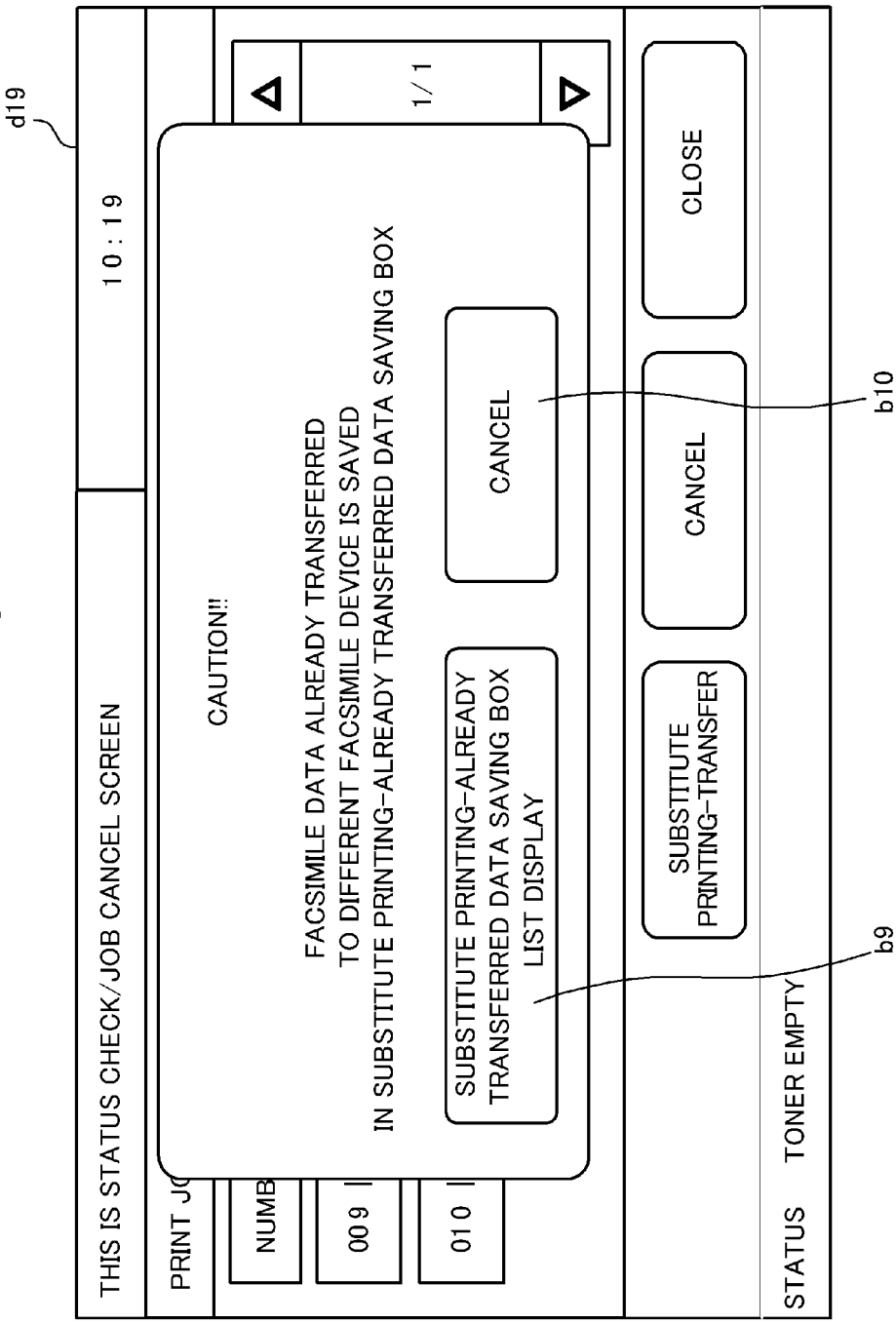

FACSIMILE DEVICE TRANSFERRING FACSIMILE DATA TO DIFFERENT DEVICE

INCORPORATION BY REFERENCE

This application relates to and claims priority from Japanese Patent Application Nos. 2013-156516, 2013-156517, each filed in the Japan Patent Office on Jul. 29, 2013, and from Japanese Patent Application Nos. 2013-159945, 2013-159946 each filed in the Japan Patent Office on 31 Jul., 2013, the entire disclosure of which are incorporated herein by reference.

BACKGROUND

This disclosure relates to a facsimile device, and more specifically to a technology of managing facsimile data when this facsimile data is transferred to a different device.

Suggested is a technology that, when the facsimile data has been received from the different facsimile device, in preparation for a situation that a facsimile device on a reception side cannot immediately print the facsimile data, the facsimile data is transferred to a different facsimile device or an image forming apparatus to permit image forming in this facsimile device or image forming apparatus.

SUMMARY

A facsimile device according to one aspect of this disclosure includes: a facsimile data reception section, a storage section, a job management section, a transfer instruction reception section, a password creation section, a data transfer section, and a delete instruction reception section.

The facsimile data reception section receives facsimile data from a different facsimile device.

The storage section stores the facsimile data received by the facsimile data reception section.

The job management section performs fax job management for the stored facsimile data.

The transfer instruction reception section receives, from a user, a transfer instruction for transferring the facsimile data managed by the job management section to a different device.

The password creation section creates a password in correspondence with facsimile data targeted for transfer when the transfer instruction reception section has received the transfer instruction.

The data transfer section transfers, to the different device, transfer data including the password created by the password creation section and the facsimile data targeted for the transfer.

The delete instruction reception section receives, from the user, a delete instruction by specification of a fax job targeted for deletion and password inputting, When the delete instruction reception section has received the delete instruction, the job management section compares a password indicated by the delete instruction with the password created in correspondence with the facsimile data of the fax job targeted for the deletion by the delete instruction, and deletes the fax job indicated by the delete instruction under condition that the passwords agree with each other.

A facsimile device according to one aspect of this disclosure includes: a facsimile data reception section, a first storage section, a job management section, a transfer instruction reception section, a password creation section, a data transfer section, a data obtaining section, a second storage section, a data management section, and a delete instruction reception section.

The facsimile data reception section receives facsimile data from a different facsimile device.

The first storage section stores the facsimile data received by the facsimile data reception section;

The job management section performs management of a fax job for the facsimile data stored in the first storage section;

The transfer instruction reception section receives, from a user, a transfer instruction for transferring the facsimile data of the fax job managed by the job management section to a different device.

The password creation section creates a password in correspondence with facsimile data targeted for transfer when the transfer instruction reception section has received the transfer instruction.

The data transfer section transfers, to the different device, transfer data including the password created by the password creation section and the facsimile data targeted for the transfer;

The second storage section stores data acquired from the data obtaining section.

The data management section moves, to the second storage section, the facsimile data transferred to the different device by the data transfer section and excluded from the job management by the job management section.

The delete instruction reception section receives, from the user, a delete instruction by specification of the facsimile data targeted for deletion from those stored in the second storage section and by password inputting, When the delete instruction reception section has received the delete instruction, the data management section determines whether or not the facsimile data targeted for the deletion by the delete instruction has been moved to the second storage section as a result of the movement, and if it has been moved, compares a password indicated by the delete instruction with the password created in correspondence with the facsimile data targeted for the deletion, and deletes the facsimile data targeted for the deletion from the second storage section under condition that the passwords agree with each other.

A facsimile device according to one aspect of this disclosure includes: a facsimile data reception section, a first storage section, a job management section, a transfer instruction reception section, a password creation section, a data transfer section, a second storage section, a data management section, and a delete instruction reception section.

The facsimile data reception section receives facsimile data from a different facsimile device.

The first storage section storing the facsimile data received by the facsimile data reception section.

The job management section performs management of a fax job for the facsimile data stored in the first storage section.

The transfer instruction reception section receives, from a user, a transfer instruction for transferring, to the different device, the facsimile data of the fax job managed by the job management section.

The password creation section creates a password in correspondence with the facsimile data targeted for transfer when the transfer instruction reception section has received the transfer instruction.

The data transfer section transfers, to the different device, transfer data including the password created by the password creation section and the facsimile data targeted for the transfer.

The second storage section stores the facsimile data transferred to the different device by the data transfer section and excluded from the job management by the job management section.

The data management section moves the facsimile data excluded from the job management to the second storage section.

The delete instruction reception section receives, from the user, a delete instruction by specification of the facsimile data targeted for deletion from among those stored in the second storage section and by password inputting.

When the delete instruction reception section has received the delete instruction, the data management section compares a password indicated by the delete instruction with the password created in correspondence with the facsimile data targeted for the deletion, and deletes the facsimile data targeted for the deletion from the second storage section under condition that the passwords agree with each other.

BRIEF DESCRIPTION OF THE DRAWINGS

FIG. 19 is a diagram showing one example of a display screen of the display section;

FIG. 32 is a flowchart showing the eighth embodiment of the fax transfer processing performed by the multifunction peripheral.

FIG. 33 is a diagram showing one example of a display screen of the display section;

DETAILED DESCRIPTION

Hereinafter, a facsimile device according to embodiments as one aspect of this disclosure will be described with reference to drawings.

Figure 1:
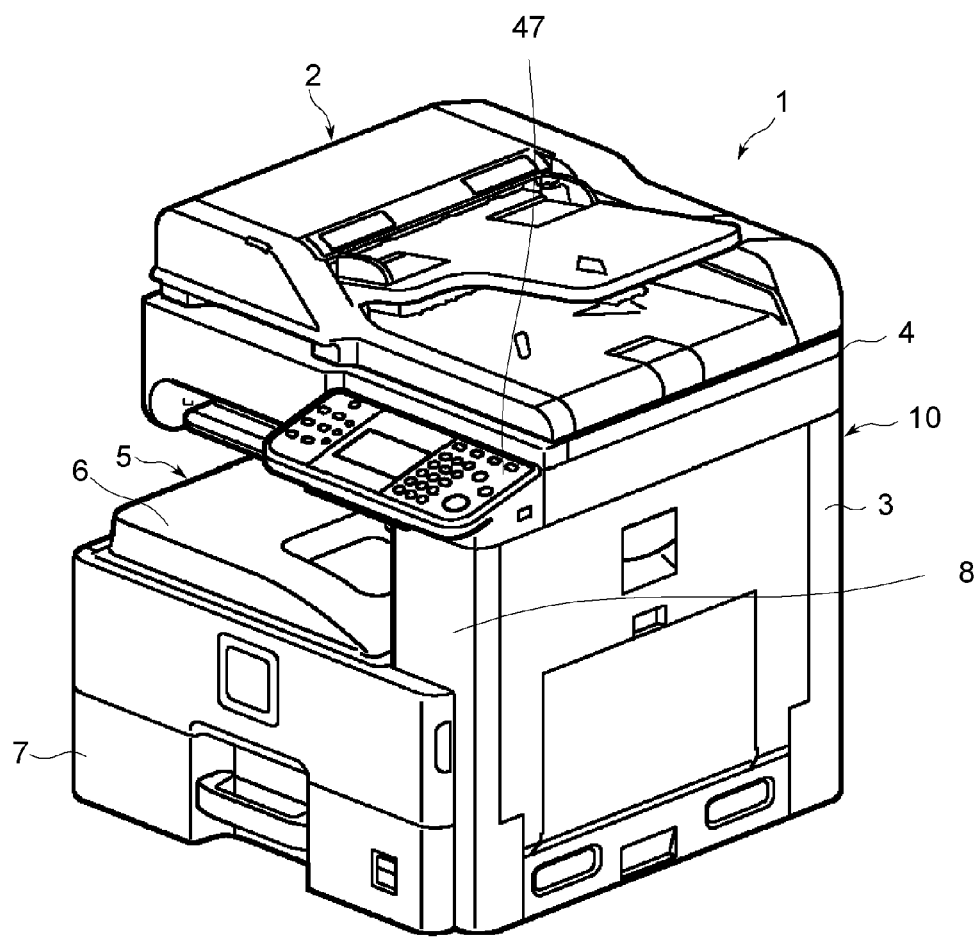
FIG. 1 is a perspective view showing exterior appearance of an image forming apparatus as a facsimile device according to one embodiment of this disclosure.

FIG. 1 is a perspective view showing exterior appearance of an image forming apparatus as a facsimile device according to one embodiment of this disclosure. The image forming apparatus as the facsimile device according to one embodiment of this disclosure is, for example, a multifunction peripheral 1.

As shown in FIG. 1, the multifunction peripheral 1 includes a device body 10 composed of a casing.

The device body 10 includes: a lower housing 3; an upper housing 4 provided on a top part thereof; and a coupling housing 8 coupling the both housings together. Formed at a middle part between the lower housing 3 and the upper housing 4 is a paper stack section 5 making its entrance to inside in a substantially horizontal direction from the side.

Moreover, provided on a front surface of the upper housing 4 is an operation section 47. Provided at the paper stack section 5 is a sheet tray 6 loading paper discharged from the lower housing 3.

The upper housing 4 has an image reading section 2 which has a flat bed therein and which reads an original copy on this flat bed by a scanner or the like.

The lower housing 3 has therein an image forming section 130 (FIG. 2) such as: a photoconductive drum, an exposure section, and a developing section forming a toner image on paper; and a fixing section for fixing the toner image on the paper.

Further provided at the lower housing 3 are paper feed cassettes 7 pooling recording paper.

Note that an example in which one paper feed cassettes 7 are included is shown in this embodiment, but the number of paper feed cassettes is not limited to this.

Built in the coupling housing 8 is a paper conveyance path for conveying recording paper after fixation in image forming processes and then discharging it to the sheet tray 6.

In the multifunction peripheral 1, an image of the original copy read by the image reading section 2 is formed on the recording paper fed from any of the paper feed cassettes 7 by the aforementioned image forming mechanism built in the lower housing 3, and the recording paper already subjected to this image forming is discharged from the paper conveyance path in the coupling housing 8 to the sheet tray 6.

Next, configuration of the multifunction peripheral 1 as the facsimile device according to the first embodiment of this disclosure will be described.

Figure 2:
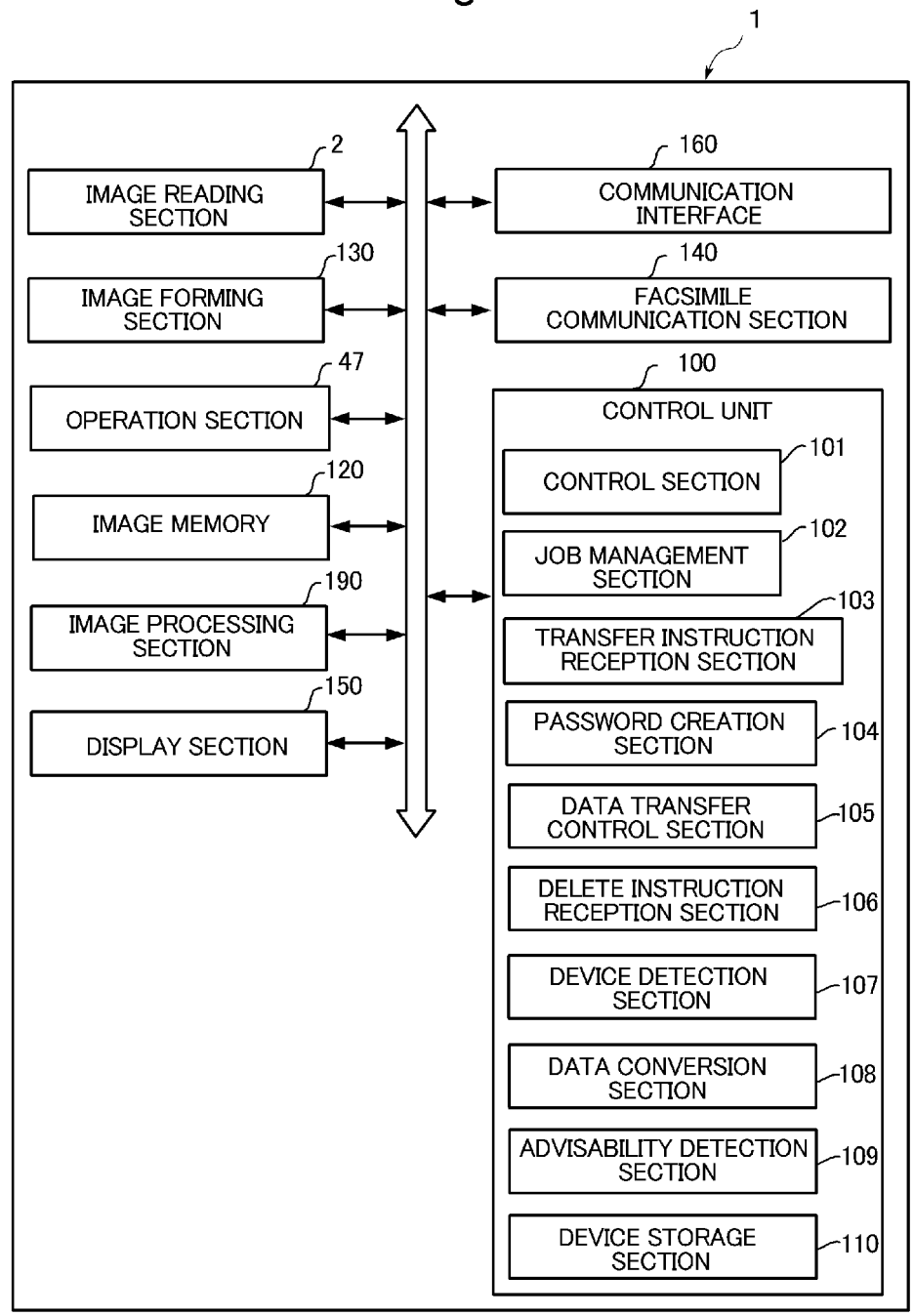
FIG. 2 is a block diagram showing an outline of inner configuration of a multifunction peripheral as a facsimile device according to first and second embodiments of this disclosure.

FIG. 2 is a block diagram showing an outline of inner configuration of the multifunction peripheral 1 as the facsimile device according to the first embodiment of this disclosure.

The multifunction peripheral 1 according to the first and second embodiments has: a control unit 100, the image reading section 2, an image memory 120, the image forming section 130, and a facsimile communication section 140.

The image reading section 2 includes, for example, a scanner that reads an original copy to acquire an original image. The image reading section 2 includes, for example, an original copy loading table, a scanner that reads an image of the original copy conveyed from the original copy loading table, and an auto document feeder (ADF) having a discharge mechanism of discharging the already read original copy.

The image reading section 2 reads original copies targeted for fax transmission independently from one copy to another, and generates data targeted for the fax transmission.

The image memory (storage section) 120 is a region that temporarily saves data targeted for image forming (printing) at the image forming section 130, including, for example, data of the original copy read by the image reading section 2 and data targeted for the fax transmission acquired by the facsimile communication section 140 or a communication interface 160.

The image forming section 130 reads out, for example, the data of the original copy read by the image reading section 2 and the data acquired by the facsimile communication section 140 or the communication interface 160, both of which are stored in the image memory 120, and performs image forming (printing) by use of this data.

The facsimile communication section (facsimile data reception section) 140 executes various functions required for facsimile communication, and performs image data transmission and reception to and from an external facsimile device via a public line.

For example, a control section 101 reads out, in page order, pages of the original copies, which have been read by the image reading section 2 for the fax transmission and which have been temporarily stored in the image memory 120, and causes the facsimile communication section 140 to perform fax transmission to a destined facsimile device specified through operation of the operation section 47 by the user.

Moreover, the control section 101 reads out, in page order, facsimile data received by the facsimile communication section 140 and temporarily stored in the image memory 120, and causes the image forming section 130 to perform image forming (printing).

The control unit 100 is composed of: for example, a CPU, a ROM, and a RAM, and is responsible for overall operation of the multifunction peripheral 1.

The control unit 100 includes: the control section 101, a job management section 102, a transfer instruction reception section 103, a password creation section 104, a data transfer control section 105, a delete instruction reception section 106, a device detection section 107, a data conversion section 108, and an advisability detection section 109.

In an HDD 170 or a ROM (not shown), a fax job management program of the multifunction peripheral 1 is stored, and the control unit 100 operates in accordance with this fax job management program, thereby including: the control section 101, the job management section 102, the transfer instruction reception section 103, the password creation section 104, the data transfer control section 105, the delete instruction reception section 106, the device detection section 107, the data conversion section 108, and the advisability detection section 109.

For the control section 101, a functional portion related to fax job management shown as each embodiment is realized by operation in accordance with the fax job management program.

Note that the control section 101 (the control section 101 for a function related to the fax job management), the job management section 102, the transfer instruction reception section 103, the password creation section 104, the data transfer control section 105, the delete instruction reception section 106, the device detection section 107, the data conversion section 108, and the advisability detection section 109 may each be formed of a hard circuit without depending on the fax job management program.

Hereinafter, the same applies to each embodiment unless otherwise specified.

Moreover, each of the control section 101 to the advisability detection section 109 described above is a component of the multifunction peripheral 1 as the embodiments of this disclosure as long as it is required in each embodiment described below.

A multifunction peripheral 1 according to the second embodiment has a control unit 100 further including a device storage section 110.

The device storage section 110 is formed of, for example, a memory built in the control unit 100, and when a fax job has been deleted by the job management section 102 based on password inputting from the user, stores, as a candidate transfer destination, a device used for transferring facsimile data of the deleted fax job.

The control section 101 is responsible for overall operation of the multifunction peripheral 1.

The job management section 102 adjusts, for example, execution order, an execution period, standby, deletion, and addition for jobs received in the multifunction peripheral 1 (for example, a print job, a scan job, a fax job, and a copy job).

For example, the job management section 102 performs fax job management for each facsimile data received by the facsimile communication section 140 and stored in the image memory 120.

In this case, the job management section 102 performs, for example, adjustment of a period for which the image forming section 130 performs image forming of each of the received facsimile data and job deletion for each facsimile data.

The transfer instruction reception section 103 receives user's input of a transfer instruction for transferring, to a different device, facsimile data targeted for the job management by the job management section 102.

This transfer instruction is inputted through operation of the operation section 47 by the user.

The different device is an image forming apparatus, such as a facsimile device, a printer, or a multifunction peripheral network-connected to the multifunction peripheral 1 by a LAN (local area network) or the Internet, which is capable of image forming of data received from outside.

Moreover, this different device may be a device, such as an information display device, which is capable of display of the data received from outside, or an external storage device such as an USB memory or an HDD.

When the aforementioned transfer instruction has been received by the transfer instruction reception section 103, the password creation section 104 creates a password in correspondence with the facsimile data targeted for transfer.

The created password is stored by the password creation section 104 or the job management section 102 in correspondence with a fax job of the facsimile data.

The data transfer control section 105 causes transfer of the transfer data having the password created by the password creation section 104 and the facsimile data targeted by the transfer instruction from the facsimile communication section 140 or the communication interface 160 to the aforementioned different device.

The data transfer control section 105 and the facsimile communication section 140 are examples of a data transfer section in the claims.

The delete instruction reception section 106, for a fax job targeted for the job management by the job management section 102, receives a delete instruction by specification of a fax job targeted for deletion and password inputting by the user.

This delete instruction is inputted through operation of the operation section 47 by the user.

In the first and second embodiments, when the delete instruction has been received by the delete instruction reception section 106, the job management section 102 compares a password indicated by the delete instruction with the password created in correspondence with the facsimile data targeted for the deletion by this delete instruction, and deletes the fax job indicated by this delete instruction under condition that these passwords agree with each other.

The device detection section 107 detects, from among devices in a local area network connected with the multifunction peripheral 1, the device capable of receiving the facsimile data targeted for the transfer by the aforementioned transfer instruction.

For example, the device detection section 107 detects, from inside of the local area network, the image forming apparatus and an information processor already set to be capable of making LAN communication with the multifunction peripheral 1, and acquires an IP address of each of the detected devices therefrom for the purpose of permitting data transmission to the devices.

The control section 101 causes a display section 150 to display the image forming apparatus detected by the device detection section 107 as a candidate facsimile data transfer destination based on the aforementioned transfer instruction.

The data conversion section 108 converts the aforementioned transfer data into a data format permitting image forming or display in the device as the transfer destination of this transfer data by the aforementioned transfer instruction, or a data format generally adopted for image forming or display in many typical devices.

In a case where image forming and display are possible without converting the data format of the facsimile data adopted in the multifunction peripheral 1, for example, in a case where the image forming apparatus as the transfer destination is of the same type as that of the multifunction peripheral 1, the data transfer control section 105 causes transmission of this facsimile data from the facsimile communication section 140 to the image forming apparatus without converting the data format of this facsimile data.

On the other hand, in a case where image forming and display are impossible in the data format of the facsimile data adopted in the multifunction peripheral 1, for example, in a case where the image forming apparatus as the transfer destination is of a different type from that of the multifunction peripheral 1, the data transfer control section 105 converts this facsimile data into a predefined standard data format, for example, a PostScript format, transmits this facsimile data subjected to the data format conversion and the password from the facsimile communication section 140 to the image forming apparatus.

Also in a case where an information processor as the transfer destination is not capable of image forming and display in the data format of the facsimile data adopted in the multifunction peripheral 1, this facsimile data is converted into a predefined standard data format, for example, Jpeg, Bitmap, PDF, or the like, and the data transfer control section 105 transmits this facsimile data subjected to the data format conversion and the password from the facsimile communication section 140 to this information processor.

The advisability detection section 109 detects whether or not the device indicated by the transfer instruction is an image forming apparatus capable of image forming in the aforementioned standard data format. In other words, the advisability detection section 109 detects advisability of image forming in the aforementioned standard data format by the device indicated by the transfer instruction.

When the advisability detection section 109 has determined that the device indicated by the aforementioned transfer instruction is an image forming apparatus capable of image forming in the aforementioned standard data format, the data transfer control section 105 causes transfer of the transfer data including the facsimile data in the aforementioned standard data format and the password to be performed from the facsimile communication section 140 to the device defined as the transfer destination by the transfer instruction.

On the other hand, when the advisability detection section 109 has detected that the device indicated by the aforementioned transfer instruction is an image forming apparatus not capable of image forming in the standard data format, the data transfer control section 105 causes transmission of the transfer data including the facsimile data in the aforementioned standard data format and the password to be performed from the facsimile communication section 140 to a predefined server on the Internet.

Assumed here is that by a printer driver function included in a server on a cloud, the image forming apparatus defined as the transfer destination of the transfer data by the aforementioned transfer instruction converts the facsimile data and the password included in the transfer data into a data format that permits image forming.

In this case, the data transfer control section 105 transmits, from the facsimile communication section 140, as the aforementioned transfer data, for example, model information indicating the image forming apparatus as the transfer destination and an IP address as information indicating a place of this image forming apparatus.

Then the server on the cloud, based on a data table indicating relationship between the stored device model and a data format corresponding to each model, specifies a data format that permits image forming at the image forming apparatus defined as the transfer destination, and converts the aforementioned facsimile data and the password into this data format.

This server, in accordance with, for example, the aforementioned IP address transmitted from the facsimile communication section 140 of the multifunction peripheral 1, transmits the aforementioned facsimile data already subjected to the data conversion and the password to the image forming apparatus defined as the transfer destination.

In this manner, the data transfer control section 105 causes transmission, via the facsimile communication section 140, of the transfer data, which has been converted into the data format suitable for the image forming apparatus as the transfer destination in the server, to be performed from the server to the image forming apparatus as the transfer destination.

Moreover, the multifunction peripheral 1 includes the operation section 47 and the display section 150.

The operation section 47 is composed of an image forming or transmission start key, ten keys, abbreviation number key, etc., and receives from the user input of various operation instructions, for example, in this embodiment, a transfer instruction and a delete instruction for the facsimile data targeted for the aforementioned job management.

The display section 150 is formed of, for example, an LCD (Liquid Crystal Display) displaying, for example, operation guide for the user.

This display section 150 may include a touch panel function, thereby receiving, as the operation section 47, the various operation instructions from the user.

Further, the multifunction peripheral 1 has: an image processing section 190 performing, for example, edit and work processing on the image ready by the image reading section 2; and the communication interface 160 for performing various data communication with a network-connected different personal computer and the server.

Next, the first embodiment of the fax transfer processing performed by the multifunction peripheral 1 will be described.

Figure 3:
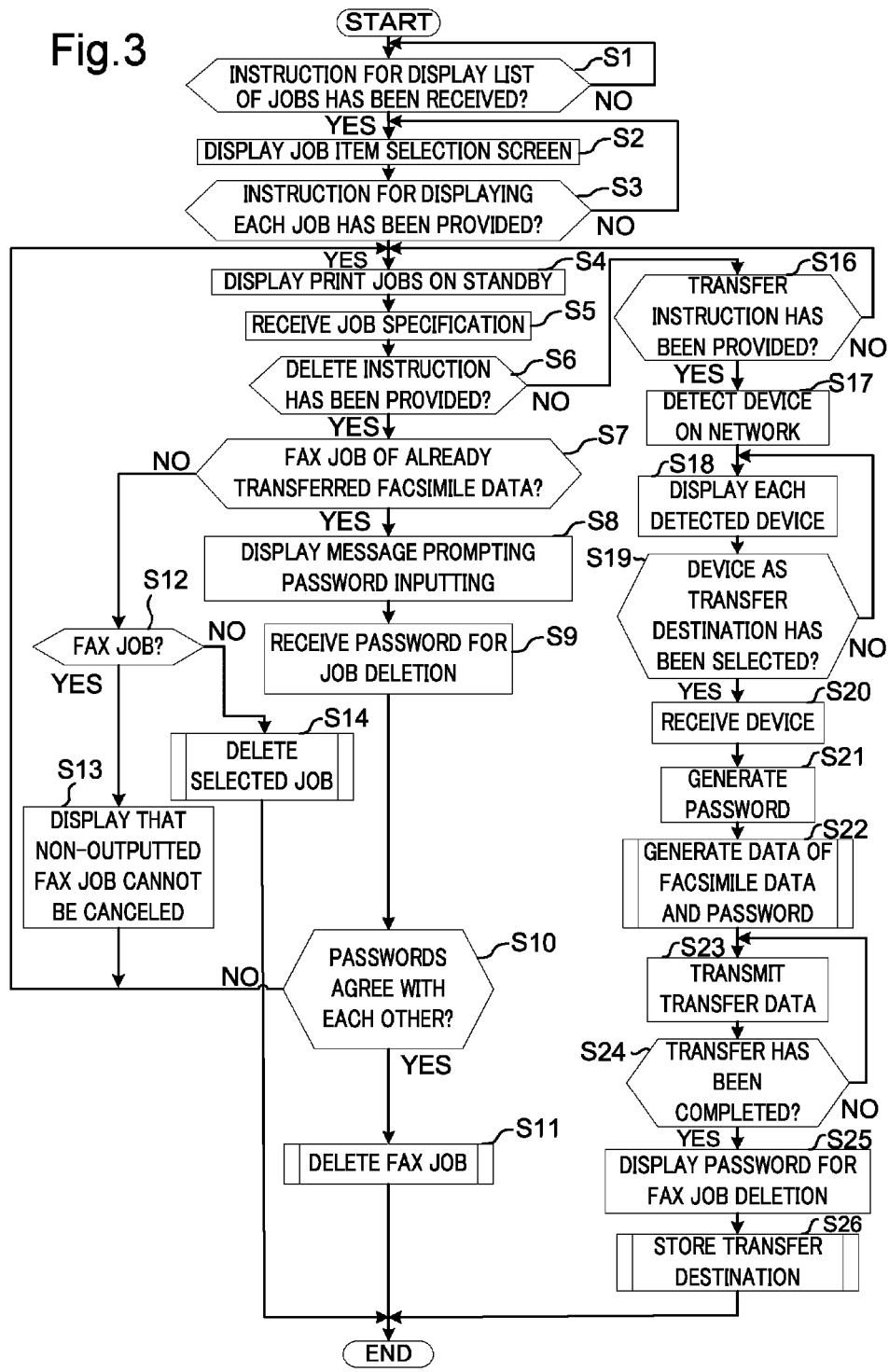
FIG. 3 is a flowchart showing the first embodiment of fax transfer processing performed by the multifunction peripheral.
Figure 4:
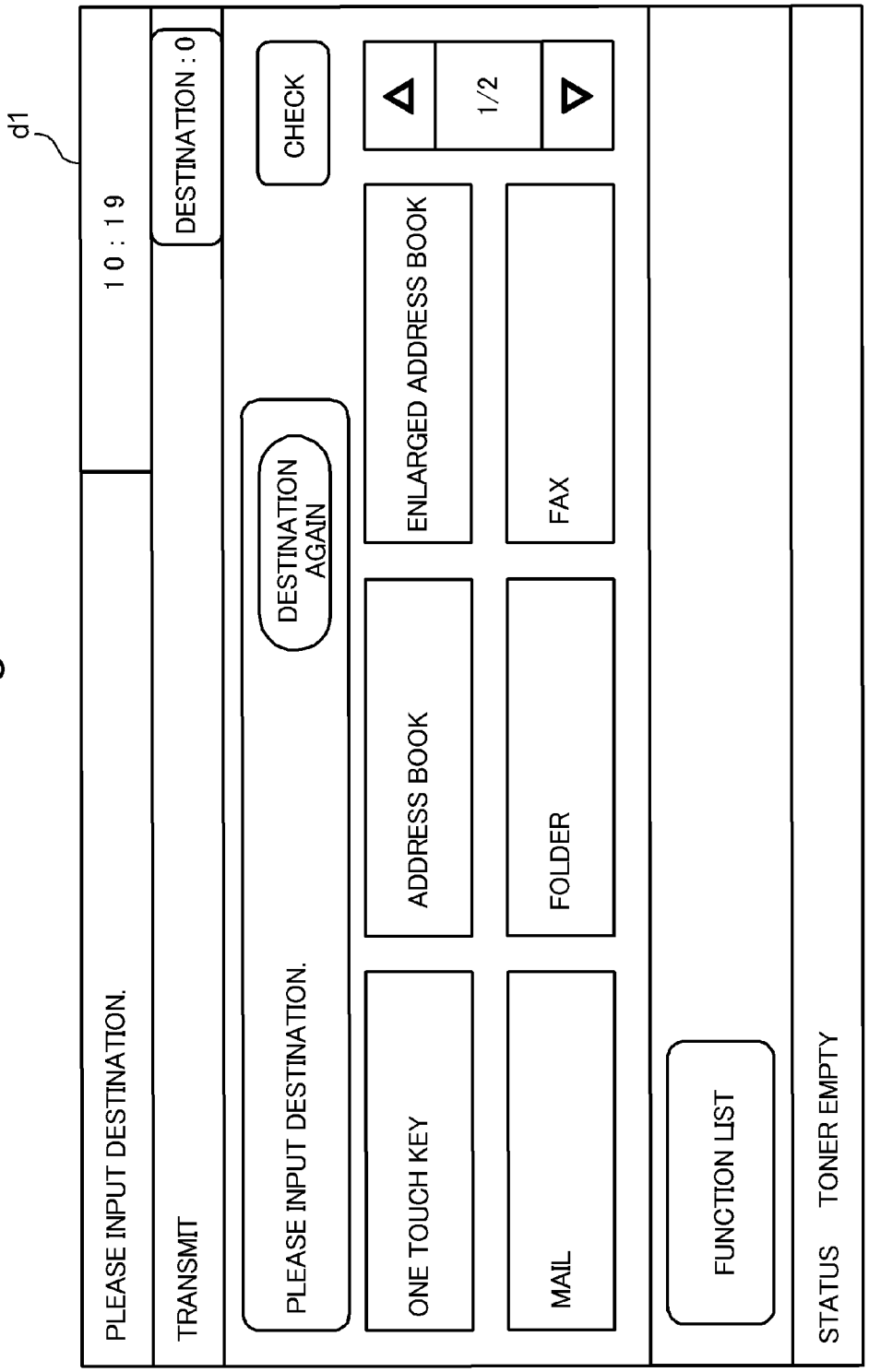
FIG. 4 is a diagram showing one example of a display screen of the display section.

FIG. 3 is a flowchart showing the first embodiment of the fax transfer processing performed by the multifunction peripheral 1.

Figure 5:
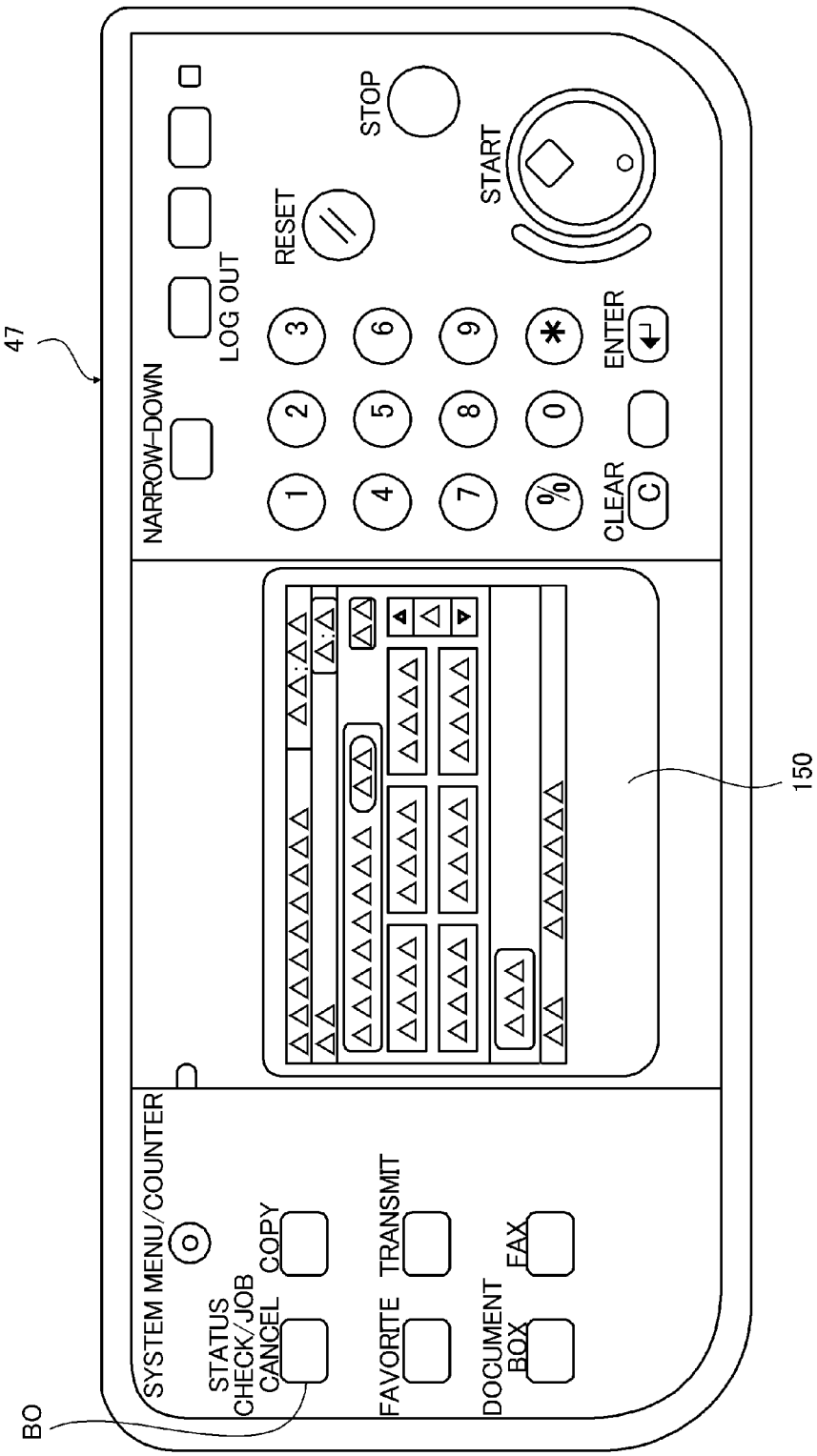
FIG. 5 is a diagram showing an operation section and a display section.

FIG. 5 is a diagram showing the operation section 47 and the display section 150.

FIG. 4 and FIGS. 6 through 14 are diagrams showing examples of a display screen of the display section 150.

When the facsimile data has been received from a different facsimile device by the multifunction peripheral 1, the job management section 102 puts, for example, image forming execution based on the facsimile data as a fax job targeted for job management.

If a different job already received, for example, a print job is present, the job management section 102 puts this fax job in a queue following the different job.

The job management section 102 puts this fax job in a standby state without executing it until arrival of its execution sequence, and upon arrival of its sequence, executes this fax job.

For example, when the multifunction peripheral 1 has received the facsimile data, in a case where this facsimile data cannot immediately be printed due to, for example, toner shortage or paper shortage in the image forming section 130, the job management section 102 puts the fax job for this facsimile data on a standby state while the received facsimile data is stored in the image memory 120.

In this case, when the job management section 102 has received information indicating resolution of the aforementioned causes, the job management section 102 puts the fax job into a queue for job execution. For example, in a case where the fax job is on a standby state due to toner shortage, the control section 101 causes the display section 150 to display a display screen (FIG. 4) having a message indicating a cause of the standby state.

In such a state, upon user's pressing of, for example, a "Status check/Job cancel" key B0 on the operation section 47 shown as an example in FIG. 5, based on this press operation, the control section 101 receives a display instruction for displaying a list of jobs in execution or on standby, that is, a list of jobs targeted for the management by the job management section 102 (YES in S1).

Figure 6:
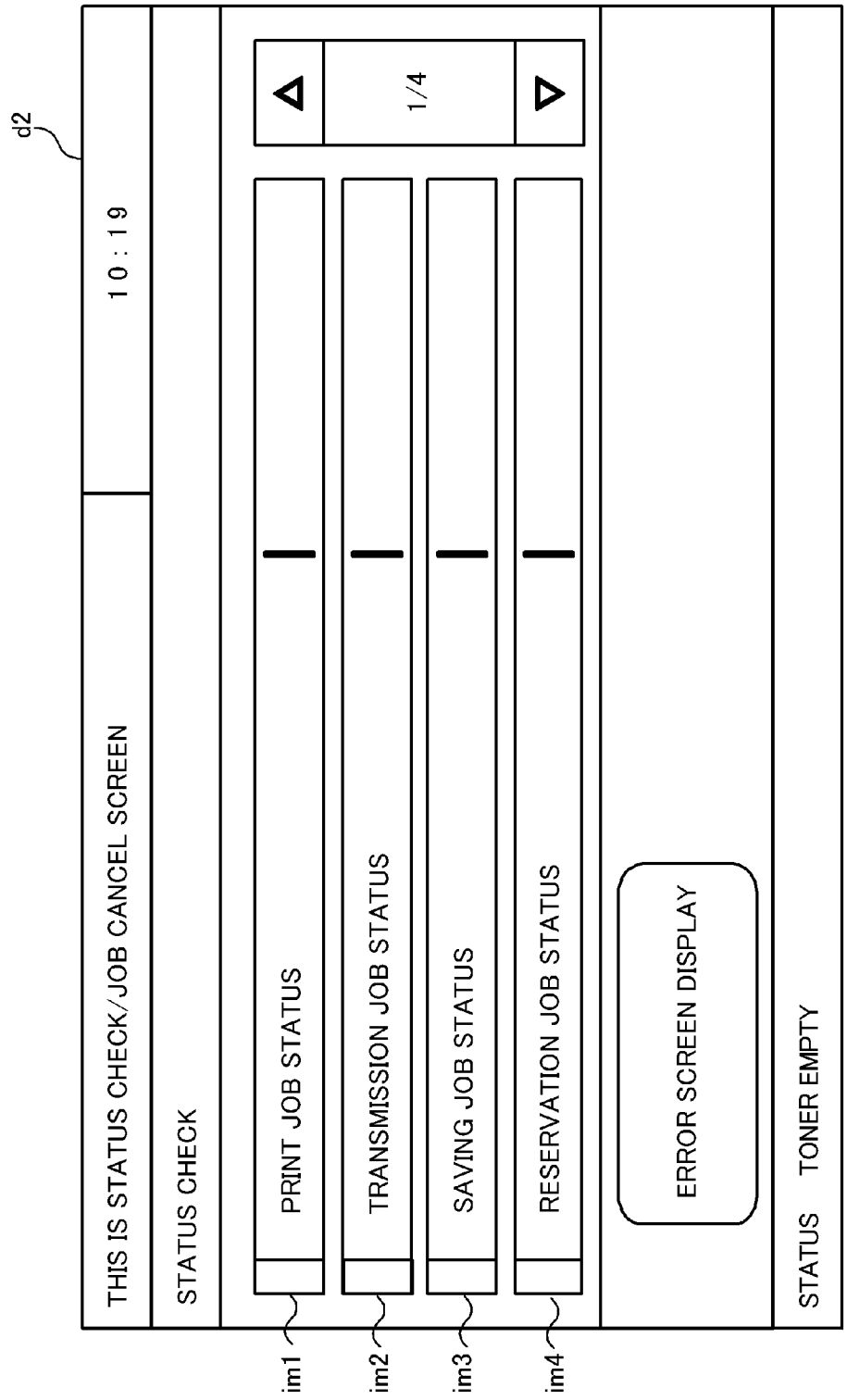
FIG. 6 is a diagram showing one example of a display screen of the display section.

At this point, the control section 101 causes the display section 150 to display, as shown as an example in FIG. 6, a display screen d2 indicating operation-by-operation job items for promoting selection of which operation job is displayed for the user (S2).

While the display screen d2 is displayed at the display section 150, upon user's pressing of an image displaying the desired job item (of images im 1 to 4 displaying the respective operation-by-operation job items, by the touch panel function displayed at the display section 150, a display instruction for displaying each job belonging to the job item corresponding to the image pressed down by the user is inputted (YES in S3).

For example, in case of the display screen d2 shown in FIG. 6, upon user's pressing of the "Print job status" image im1, a display instruction for requesting for display of a list of print jobs as the items corresponding to the image im1 and in a printing standby state is inputted.

Then the control section 101 causes the display section 150 to display the list of jobs belonging to the job item indicated by the user and in the standby state (S4). For example, the control section 101 causes the display section 150 to display a display screen d3 shown as an example in FIG. 7.

As described above, in a case where a plurality of jobs are intensively present within a fixed period of time, the job management section 102 manages a plurality of jobs on a standby state in queue with the other jobs.

As described above, displayed on the display screen d3 are images im5 and im6 indicating jobs which have not yet been completely executed and are targeted for the management by the job management section 102 and which have been extracted as print jobs specified by the user.

Figure 7:
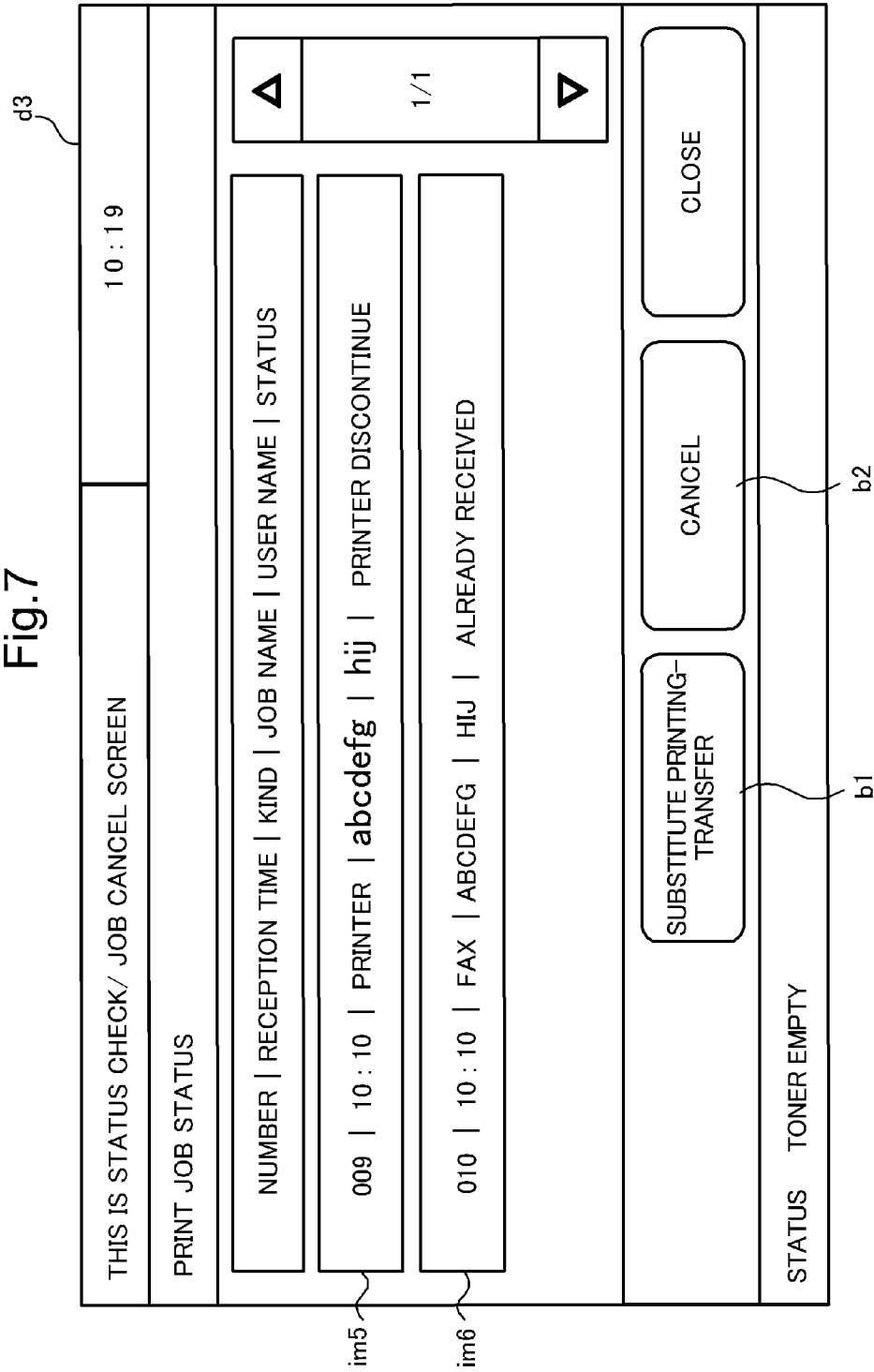
FIG. 7 is a diagram showing one example of a display screen of the display section.

When the display screen d3 shown in FIG. 7 is displayed, upon user's pressing of an image indicating the desired job, by the touch panel function disposed at the display section 150, an instruction for specifying the job corresponding to this image is received (S5).

For example, upon pressing of the image im6 indicating the fax job, by the touch panel function disposed at the display section 150, an instruction for specifying the fax job corresponding to this image im6 is received.

Further, upon user's pressing of a "Substitute printing—transfer" button b1, a transfer instruction corresponding to the "Substitute printing—transfer" button b1 is inputted by the aforementioned touch panel function, and is received by the transfer instruction reception section 103 (NO in S6, YES in S16).

This transfer instruction is an instruction for requesting for transferring, to the network-connected different device, facsimile data targeted for image forming by the specified fax job described above.

The transfer instruction reception section 103 receives this transfer instruction only in a case where the job specified in S5 is the fax job.

When the aforementioned transfer instruction has been received by the transfer instruction reception section 103, the device detection section 107 detects, from among a printer (including the multifunction peripheral), a fax, a computer, and an external memory present on the network connected with the multifunction peripheral 1, the device capable of image forming, display, or storage of the data transmitted from the multifunction peripheral 1 (S17).

In case of the external memory, the device detection section 107 also detects, as the aforementioned devices on the network, an HDD (for example, NAS) on the network and a USB memory connected to a USB interface disposed in the multifunction peripheral 1.

As a result, the user performing facsimile data transfer can easily recognize the devices that can be set as the transfer destinations.

Then the control section 101 causes the display section 150 to display images indicating the respective detected devices (S18).

Figure 8:
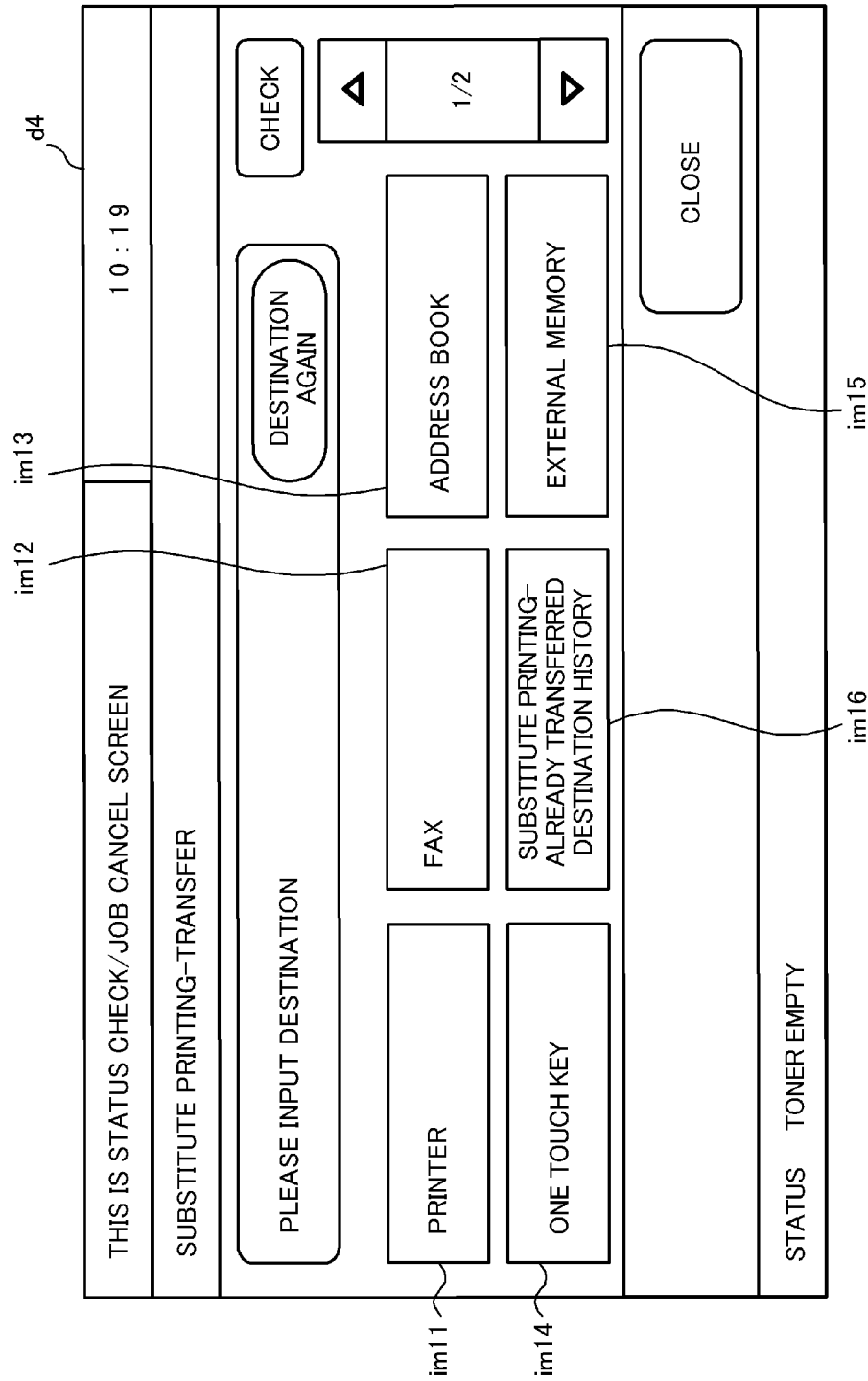
FIG. 8 is a diagram showing one example of a display screen of the display section.

For example, as shown as an example of FIG. 8, in a case where the printer (including the multifunction peripheral), the fax, the computer, and the external memory are detected as the aforementioned devices present on the network by the device detection section 107, the control section 101 causes the display section 150 to display a display screen d4 having a "Printer" image im11, a "Fax" image im12, an "Address book" image im13, a "One touch key" image im14, and an "External memory" image im15 which respectively indicate the aforementioned devices.

The "Address book" image im13 and the "One touch key" image im14 indicate that the computer has been detected.

Moreover, the display screen d4 displays presence of a plurality of printers by display of the one "Printer" image im11 even in a case where the plurality of printers have been detected.

The same applies to the facsimile device, the computer, and the external memory.

Upon user's pressing of the "Printer" image im11 when the aforementioned display screen d4 is displayed at the display section 150, by the touch panel function, an instruction corresponding to this "Printer" image im11, that is, an instruction for requesting for display of the detected printers described above is received by the control section 101.

The control section 101, upon the reception of this instruction, causes the display section 150 to display each of the detected printers described above.

Figure 9:
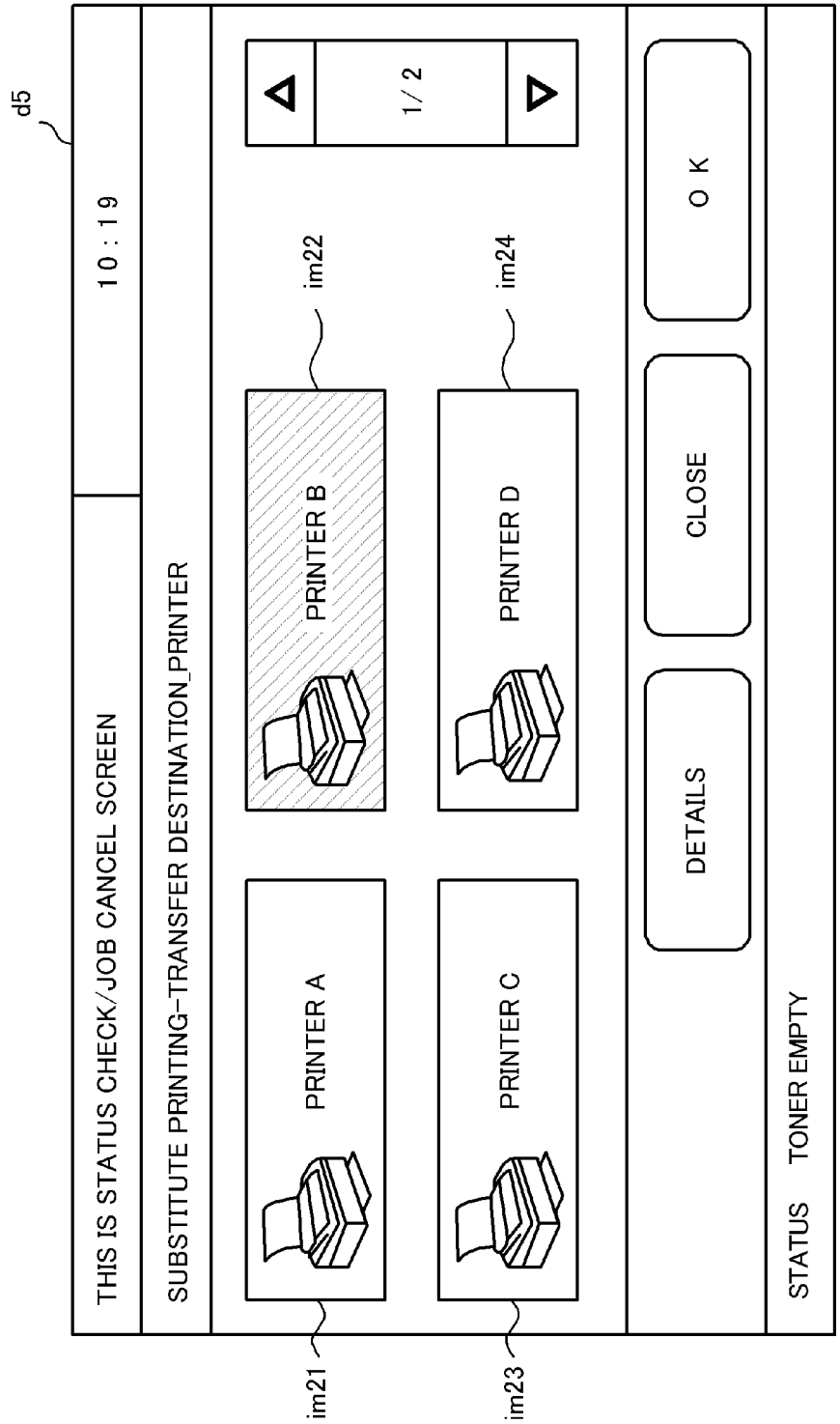
FIG. 9 is a diagram showing one example of a display screen of the display section.

For example, as shown in FIG. 9, the control section 101 causes the display section 150 to display a display screen d5 having images im21 to 24 displaying the respective detected printers.

Upon user's pressing of the "Address book" image im13 when the aforementioned display screen d4 is displayed at the display section 150, by the touch panel function, an instruction corresponding to this "Address book" image im13, that is, an instruction for requesting for display of the detected computers described above is received.

The control section 101, upon the reception of this instruction, causes the display section 150 to display each of the detected computers described above.

Figure 10:
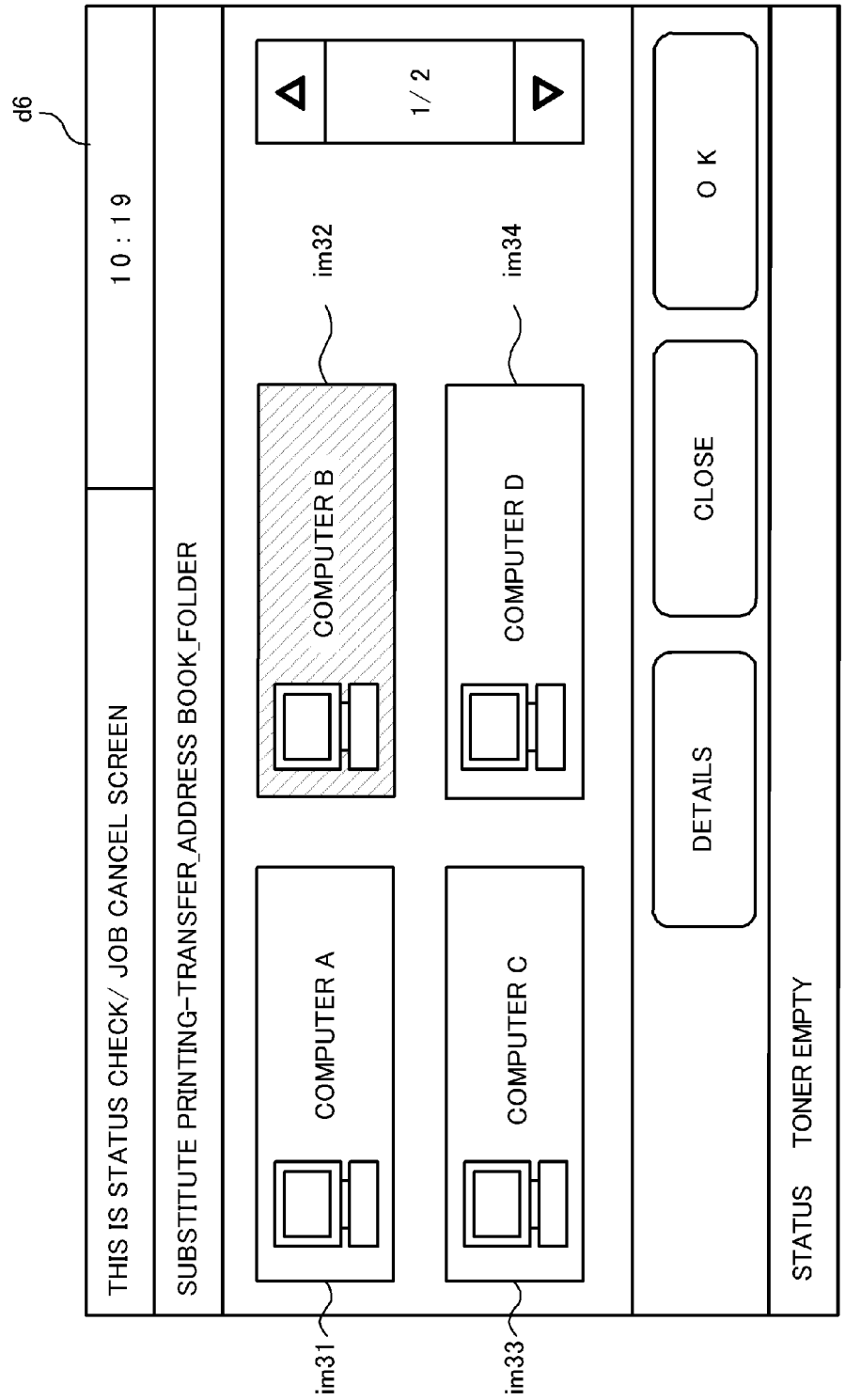
FIG. 10 is a diagram showing one example of a display screen of the display section.

For example, as shown in FIG. 10, the control section 101 causes the display section 150 to display a display screen d6 having images im31 to im34 displaying the respective detected computers.

Here, if an instruction for specifying any of the devices displayed as a result of the aforementioned detection is inputted by the aforementioned touch panel through, for example, by pressing the image indicating the desired printer to be defined as the transfer destination by the user (YES in S19), the transfer instruction reception section 103 receives this specified device as a device as a transfer destination of facsimile data targeted for transfer by the aforementioned transfer instruction (S20).

Upon reception of the aforementioned transfer destination by the transfer instruction reception section 103, the password creation section 104 subsequently creates a password for this facsimile data targeted for the transfer (S21).

After the password creation, the data transfer control section 105 adds an additional page to a last page indicated by the aforementioned facsimile data targeted for the transfer, attaches an image indicating the created password described above, and generates this data as transfer data (S22).

After the generation of this data, the data transfer control section 105 transfers the transfer data including the generated data from the facsimile communication section 140 to the device specified as the aforementioned transfer destination (S23).

Then if processing of transferring the aforementioned transfer data by the data transfer control section 105 ends (YES in S24), the control section 101 causes the display section 150 to display the aforementioned password (S25).

Figure 11:
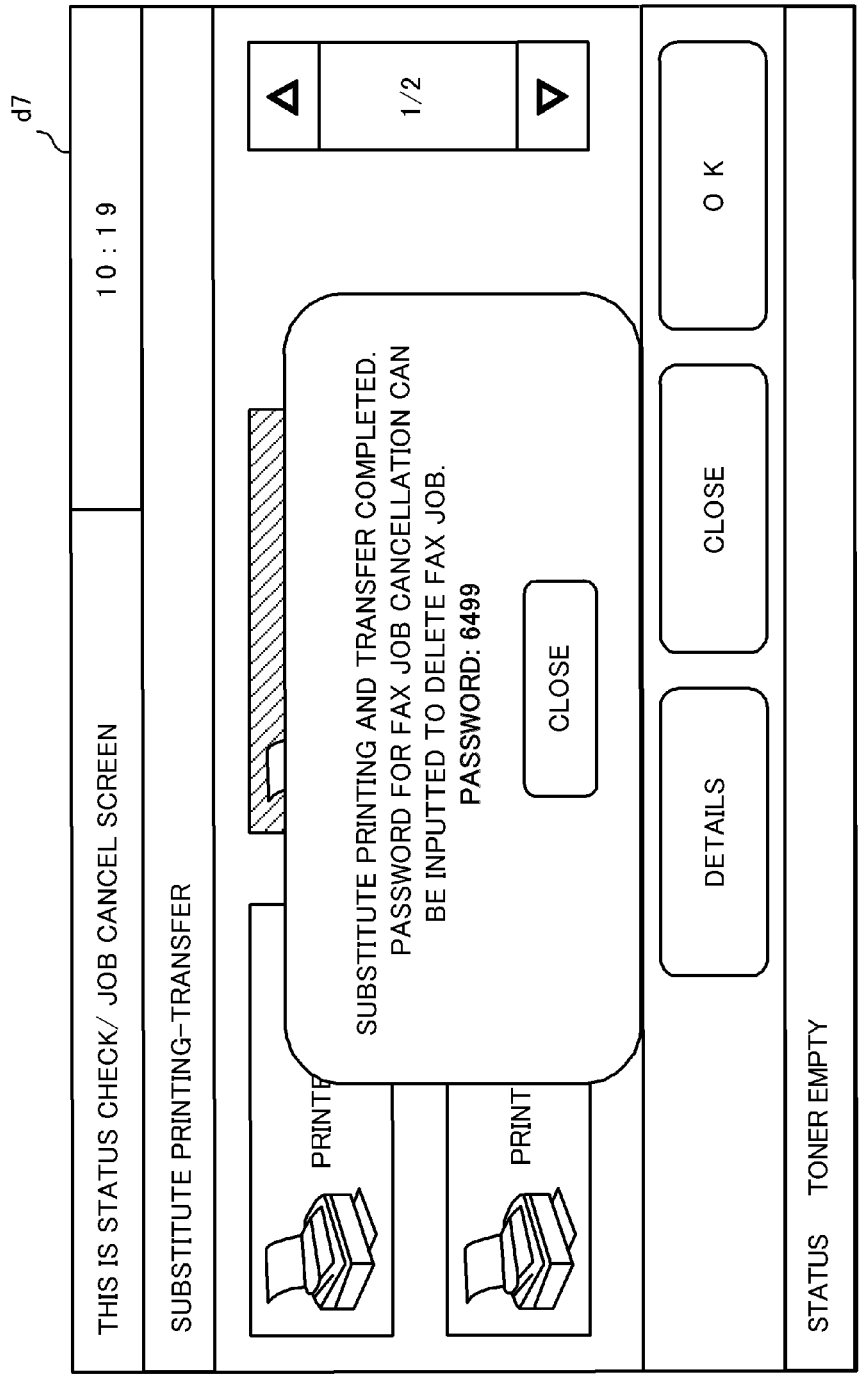
FIG. 11 is a diagram showing one example of a display screen of the display section.

For example, the control section 101 causes the display section 150 to display a display screen d7 shown as an example in FIG. 11, thereby reporting that, to delete the password created in S21 and transferred to the aforementioned transfer destination and a fax job for the transferred facsimile data, inputting of this password is required.

After the aforementioned transfer, the job management section 102 stores the device defined as the transfer destination of the aforementioned transfer data in correspondence with the fax job of the facsimile data targeted for the transfer (S26).

The processing ends after S26.

On the other hand, in S4 described above, when the control section 101 causes the display section 150 to display, for example, the display screen d3 shown in FIG. 7 indicating a list of jobs on standby, an instruction for specifying the job is received (S5), and when a "Cancel" button is further pressed by the user, a delete instruction for deleting (cancelling) the specified job described above is received by the delete instruction reception section 106 by the aforementioned touch panel function (YES in S6).

At this point, the job management section 102 determines whether or not the job targeted by this delete instruction is a fax job for which facsimile data transfer has been completed in S23 described above (S7).

Figure 12:
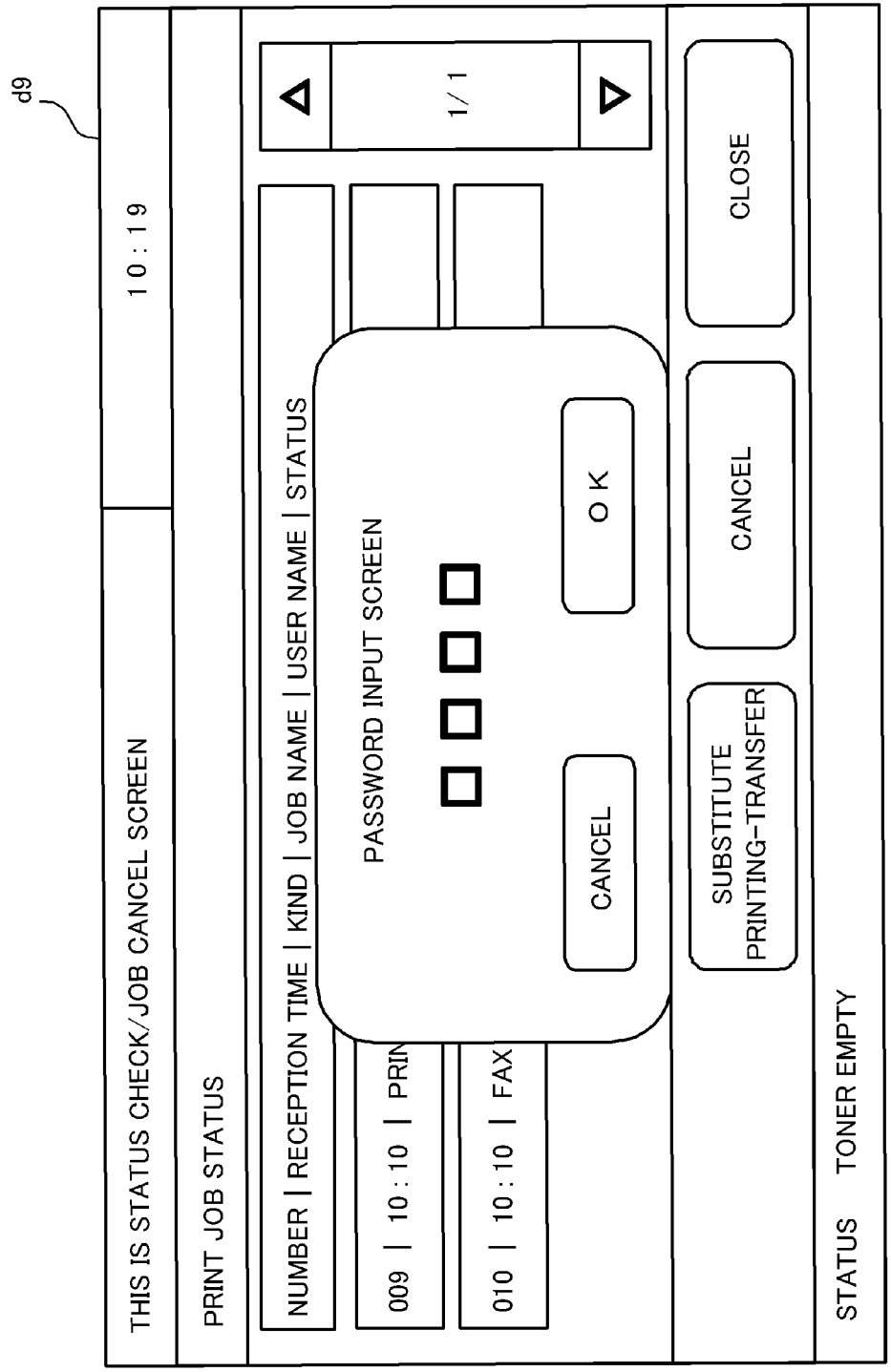
FIG. 12 is a diagram showing one example of a display screen of the display section.

At this point, if the job management section 102 determines that this fax job is the already transferred fax job described above (YES in S7), the control section 101 causes the display section 150 to display, for the user, a message prompting password inputting by, for example, displaying a display screen d9 shown as an example in FIG. 12 (S8).

Here, upon password inputting by, for example, operation of the operation section 47 by the user, the delete instruction reception section 106 receives this (S9).

The job management section 102 determines whether or not this inputted password agrees with the password created by the password creation section 104 in S21 (S10).

If the job management section 102 has determined that this inputted password does not agree with the password created by the password creation section 104 in S21 (NO in S10), the job management section 102 does not delete the fax job targeted for the deletion by this delete instruction, and the processing returns to S4, and the control section 101 causes the display section 150 to display the display screen d3 (FIG. 7) again.

On the other hand, if the job management section 102 has determined that the inputted password agrees with the password created by the password creation section 104 in S21 (YES in S10), the job management section 102 deletes (cancels) the fax job targeted for the deletion by this delete instruction (S11).

Specifically, under condition that the both passwords described above agree with each other, the job management section 102 cancels the job management of this fax job and excludes it from a waiting line. After S11, the processing ends.

If the job management section 102 has determined in S7 that the job targeted by the delete instruction is not a fax job of the facsimile data already transferred in S23 (NO in S7), if the job targeted by this delete instruction is a fax job (YES in S12), this fax job is not deleted.

Figure 13:
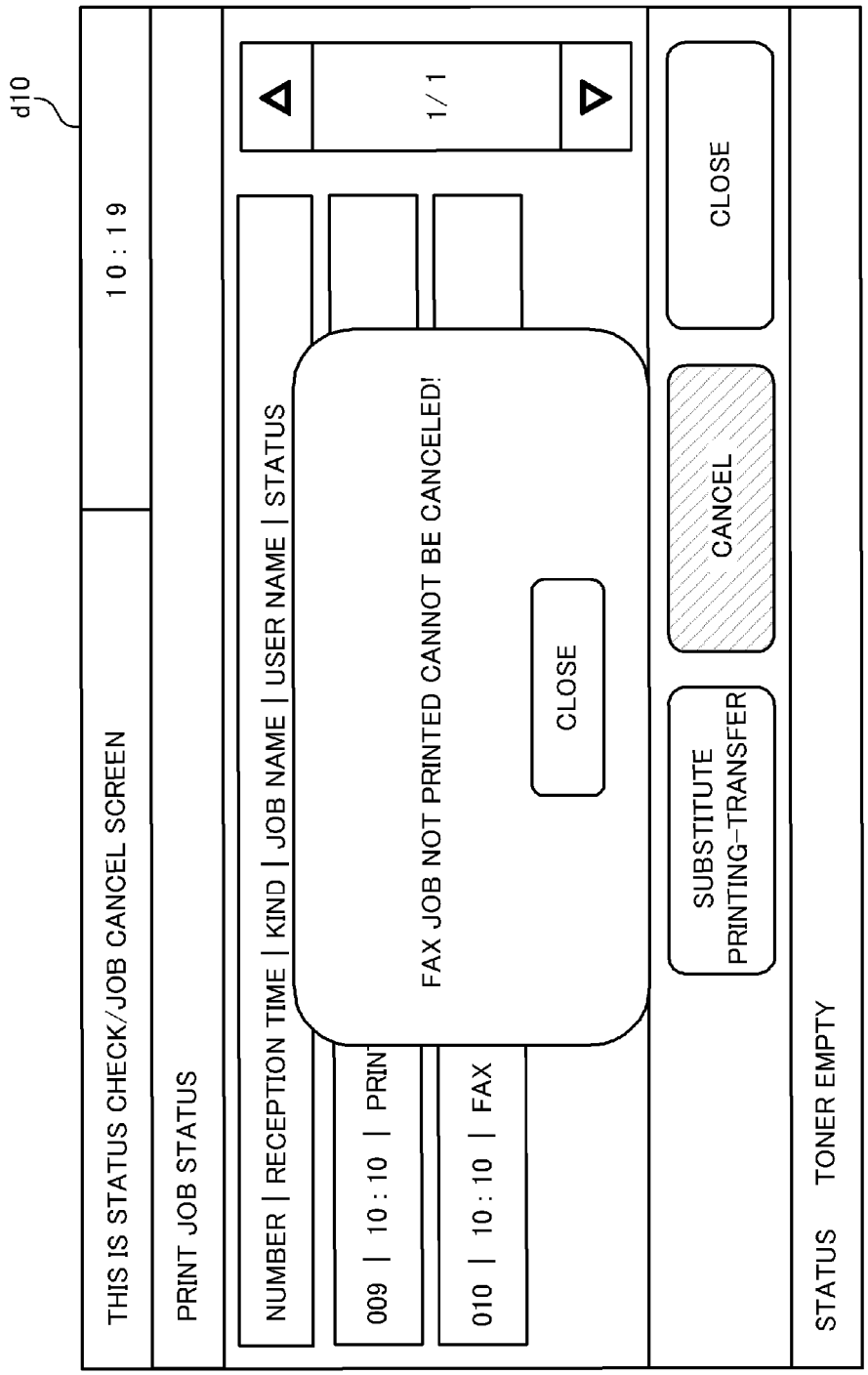
FIG. 13 is a diagram showing one example of a display screen of the display section.

The control section 101 causes the display section 150 to display, for example, by a display screen d10 shown in FIG. 13, a message indicating that a non-outputted fax job for which image forming or display has not yet been finished cannot be canceled (S13).

If the job management section 102 has determined in S12 that the job targeted by this delete instruction is not a fax job (NO in S12), it deletes this job (S14).

As described above, in this embodiment, transmitting together, as transfer data, the password created by the password creation section 104 when the data transfer control section 105 transfers the facsimile data to a different device makes it possible to print, display, and store the password in addition to this facsimile data in the device that has received this transfer data.

As a result, it is possible for the user to obtain contents indicated by this facsimile data and the password in this device as the transfer destination.

Then the job management section 102 deletes the fax job for the facsimile data under condition that this password is inputted from the user and the inputted password and the created password agree with each other.

Here, in a case where the user can recognize the password together with the contents indicated by the facsimile data in the aforementioned device as the transfer destination, it is possible to recognize the password for deleting this facsimile data, and thus when the job management section 102 deletes the fax job for this facsimile data, this facsimile data is printed, displayed, or printed or displayed based on the storage in any of the devices.

Moreover, when this password has been inputted, the job management section 102 can delete the fax job to reduce the amount of data stored in, for example, the memory, thus preventing memory full.

As a result, in a case where this facsimile data can be printed or displayed in the device different from the multifunction peripheral 1 as a reception source through facsimile data transfer, under condition that the password corresponding to the transferred facsimile data is inputted, the facsimile data is deleted from the image memory 120, thereby making it possible to reliably ensure the properly received facsimile data while preventing memory full as a result of facsimile data saving in the device as the reception source.

For example, in a typical facsimile device, the user can get access to a print of the received facsimile data by the different device, but in a case where the facsimile data is immediately erased from the original facsimile device after the facsimile data is transferred from this original facsimile device, printing failure in the device as the transfer destination leads to condition that this facsimile data cannot be ensured although it is properly received facsimile data. On the other hand, saving this facsimile data in the original facsimile device for a long period of time for the purpose of ensuring the facsimile data results in a risk of memory full.

Moreover, in the typical facsimile device, to transfer the facsimile data to the different image forming apparatus as described above and ensure the facsimile data through printing at the transfer destination, it is required to reliably execute printing in the image forming apparatus as the transfer destination.

According to this embodiment, these problems can be solved, and as described above, to transfer the received facsimile data to the device different from the device as a reception source to achieve image forming or display, the properly received facsimile data can reliably be ensured while preventing memory full as a result of facsimile data saving in the device as the reception source.

Next, the second embodiment of the fax transfer processing performed by the multifunction peripheral 1 will be described.

Figure 14:
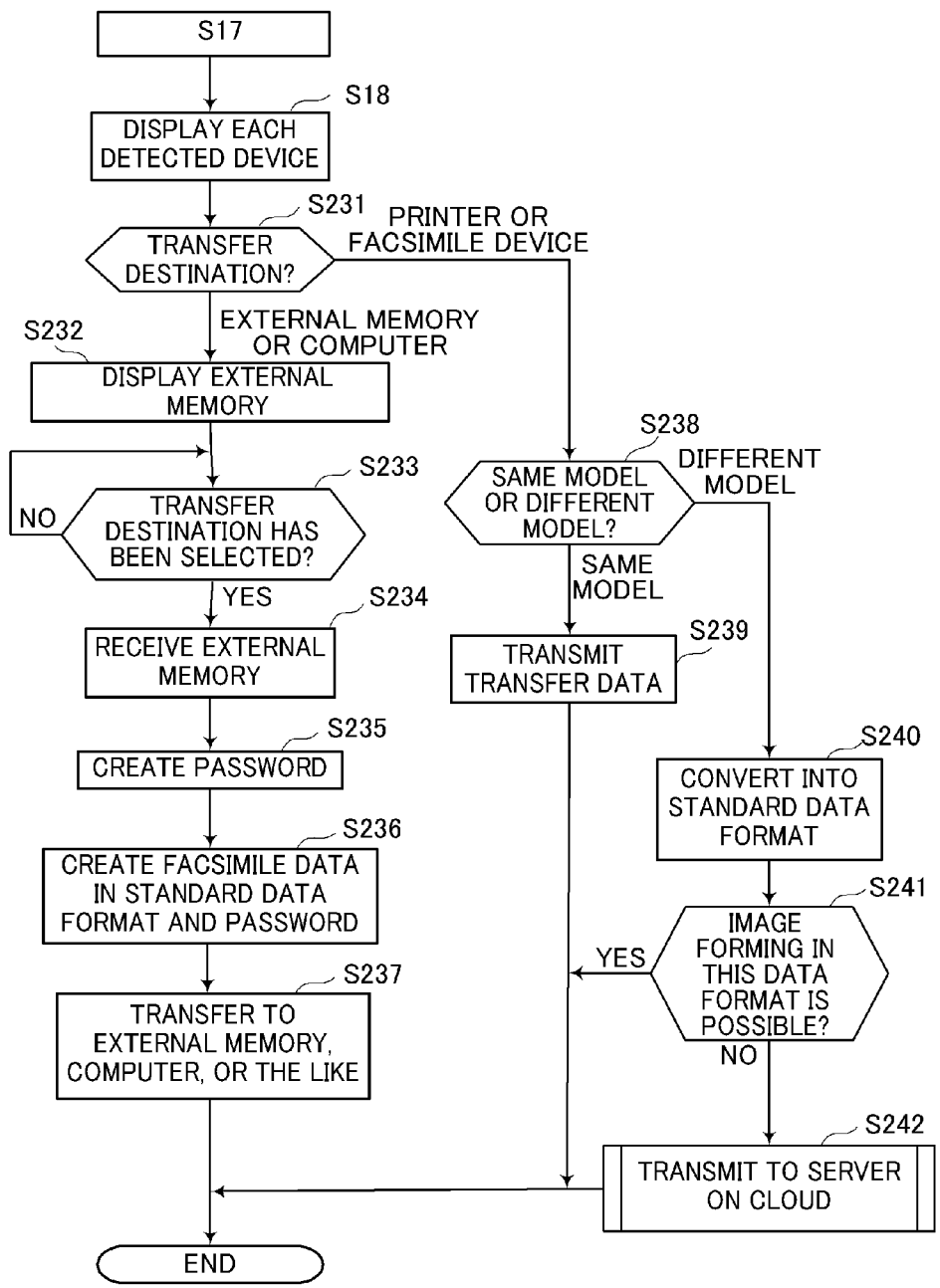
FIG. 14 is a flowchart showing the second embodiment of the fax transfer processing performed by the multifunction peripheral.

FIG. 14 is a flowchart showing the second embodiment of the fax transfer processing performed by the multifunction peripheral 1.

The same processing as that of the first embodiment will be omitted from illustration and the description.

In the second embodiment, following S18 in the aforementioned first embodiment, the following processing is performed.

When the control section 101 causes the display section 150 to display by, for example, the display screen d4 (FIG. 8) the images showing the respective devices on the network detected by the device detection section 107 as described above (S18), upon user's pressing of the "External memory" image im15, by the touch panel function, an instruction corresponding to this "External memory" image im15, that is, an instruction for requesting for display of the detected external memories described above is received by the control section 101 ("External memory or Computer" in S231).

Upon reception of this instruction, the control section 101 causes the display section 150 to display each of the detected external memories described above (S232).

For example, the control section 101 causes the display section 150 to display a display screen d11 having image im51 to 52 displaying the respective detected external memories.

Here, when an instruction for specifying any of the external memories displayed as a result of the aforementioned detection is inputted by the aforementioned touch panel function by, for example, user's pressing of the image indicating the external memory desired to be a transfer destination (YES in S233), the transfer instruction reception section 103 receives this specified external memory as the device defined as a transfer destination of the facsimile data targeted for transfer by the aforementioned transfer instruction (S234).

Upon the reception of the aforementioned transfer destination by the transfer instruction reception section 103, the password creation section 104 subsequently creates a password for the facsimile data targeted for transfer (S235).

After the password creation, the data transfer control section 105 generates transfer data including the aforementioned facsimile data targeted for the transfer and the password, and further the data conversion section 108 converts this data into a predefined standard data format, for example, Jpeg, Bitmap, or PDF (S236).

After the conversion into this data format, the data transfer control section 105 transfers transfer data including this data subjected to data conversion to the external memory specified as the aforementioned transfer destination (S237).

In a case where the user presses the "Address book" image im13 in S18, by the touch panel function, an instruction corresponding to this "Address book" image im13, that is, an instruction for requesting for display of the detected computers described above is received by the control section 101 ("External memory or computer" in S31).

The control section 101 causes the display section 150 to display the aforementioned display screen d6 (FIG. 10) and display each of the detected computers described above (S232).

Here, when an instruction for specifying any of the computers displayed as a result of the aforementioned detection is inputted by the aforementioned touch panel function by, for example, user's pressing of the image indicating the computer desired to be a transfer destination (S233), as in S234 to S236 described above, transfer destination reception, password creation, and conversion into the predefined standard data format are performed, and the data already subjected to the conversion is transferred to the computer specified as the aforementioned transfer destination (S237).

As described above, the transmission of the aforementioned transfer data to the external memory or the computer after its conversion into the predefined standard data format by the data conversion section 108 makes it possible to perform image forming or display of the aforementioned transfer data in the device of a model completely different from that of the multifunction peripheral 1.

Moreover, making it possible to output the transfer data to the external memory can widen possibility that image forming or display of transfer data stored in this external memory can be performed in various devices.

Moreover, in S231 described above, if the image forming apparatus (the printer or the facsimile data) is selected as the transfer destination of the facsimile data through the operation of the operation section 47 by the user ("Printer or Facsimile device" in S231), the data transfer control section 105 determines whether the printer or the facsimile device defined as this transfer destination is of the same model as or a model different from that of the multifunction peripheral 1 (S238).

Here, if the data transfer control section 105 has determined that the printer or the facsimile device as this transfer destination is of the same model as that of the multifunction peripheral 1 ("Same model" in S238), the transfer data including the facsimile data targeted for the aforementioned transfer and the password is transferred to the printer or the facsimile device defined as the transfer destination (S239).

For example, the data transfer control section 105 previously holds an IP address of the printer or the facsimile device as the transfer destination, and transmits the aforementioned transfer data to this IP address through FTP transfer.

Moreover, if the data transfer control section 105 has determined that the printer or the facsimile device as this transfer destination is of the model different from that of the multifunction peripheral 1 ("Different model" in S238), the data transfer control section 105 generates transfer data including the facsimile data targeted for the aforementioned transfer and the password, and further the data conversion section 108 converts this generated data into a predefined standard data format, for example, Post Script as a data format frequently applied for image forming in an image forming apparatus (S240).

As described above, the transmission of the aforementioned transfer data to the printer or the facsimile data after its converting into the predefined standard data format by the data conversion section 108 makes it possible to perform image forming or display of the aforementioned transfer data in the image forming apparatus of the model different from that of the multifunction peripheral 1.

Subsequently, the advisability detection section 109 determines whether or not the printer or the facsimile device defined as the transfer destination can perform image forming of the data in the predefined typical data format described above (S241).

If the advisability detection section 109 has determined that this image forming apparatus can perform the image forming of this data in the typical data format (YES in S241), the data transfer control section 105 transfers the transfer data including the facsimile data and the password, which have been in the aforementioned typical data format, to the printer or the facsimile device defined as the transfer destination (S239).

In this case, the data transfer control section 105 may transmit the aforementioned transfer data through FTP transfer to the previously held IP address of the printer or the facsimile device as the transfer destination, or if the IP address is not held, may transmit the aforementioned transfer data to an IP address inputted through operation of the operation section 47 by the user.

On the other hand, if the advisability detection section 109 has determined that image forming of the data in the predefined typical data format described above is impossible (NO in S241), the data transfer control section 105 transmits this data in the typical data format from the facsimile communication section 140 to a predefined server on the cloud (S242), and on this server, this data converted into the data format applicable to the printer or the facsimile device defined as the transfer destination is transmitted from this server to the printer or the facsimile device defined as the transfer destination.

As described above, use of data conversion function by the server on the cloud makes it possible to perform image forming or display of the facsimile data through the aforementioned data transfer in many models different from the multifunction peripheral 1 while reducing loads of the data conversion function to be included in the multifunction peripheral 1.

Figure 16:
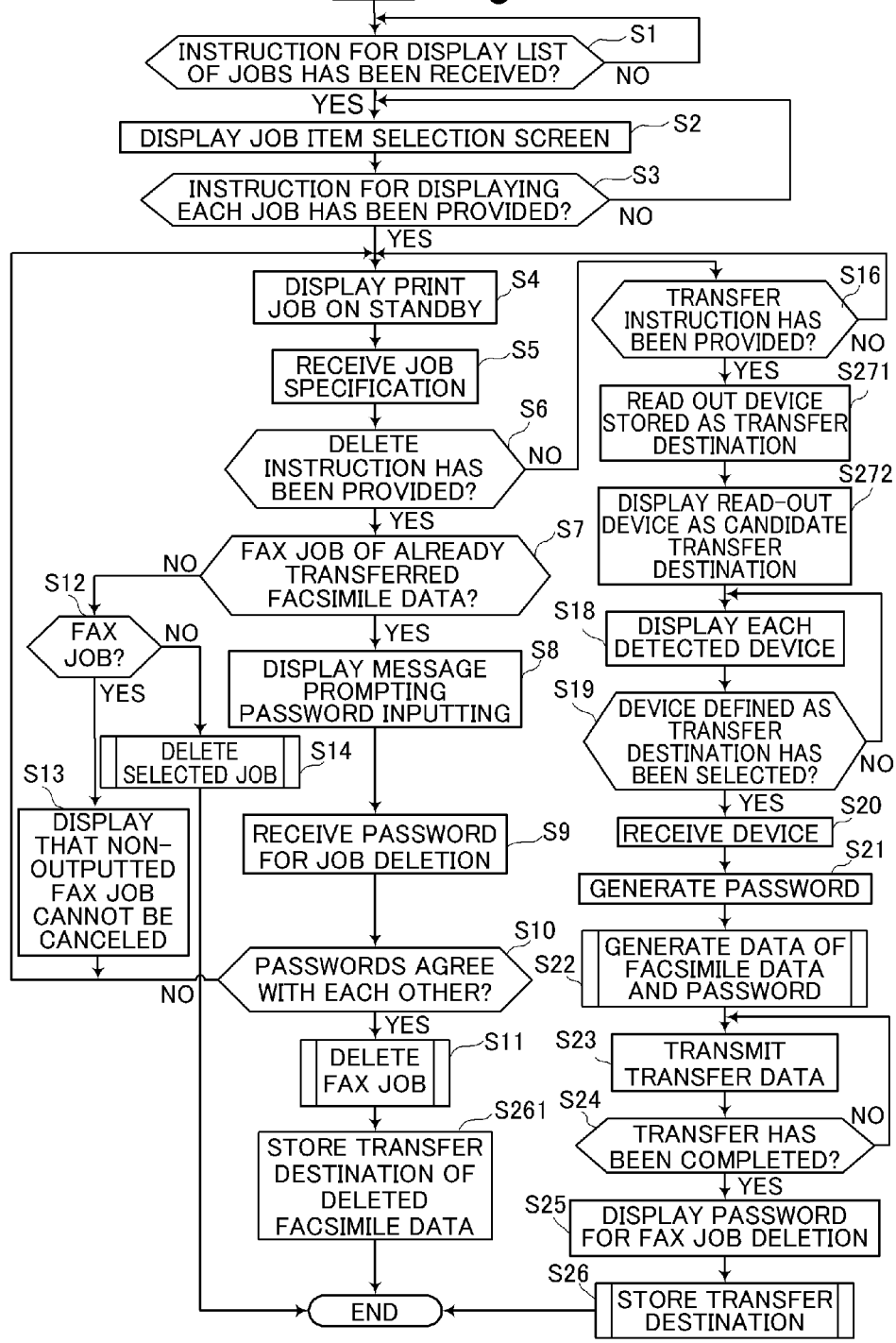
FIG. 16 is a flowchart showing the fax transfer processing performed by the multifunction peripheral according to the second embodiment.

The fax transfer processing performed by the multifunction peripheral 1 according to the second embodiment will be described. FIG. 16 is a flowchart showing the fax transfer processing performed by the multifunction peripheral 1 according to the second embodiment.

The same processing as the fax transfer processing performed by the multifunction peripheral 1 according to the first embodiment shown in FIG. 3 will be omitted from the description.

In the second embodiment, after the fax job was deleted in S11 described above, the device storage section 110 stores, as a candidate transfer destination, the device used for the transfer of this deleted facsimile data (S261).

Figure 17:
FIG. 17 is a diagram showing one example of a display screen of the display section.

Then when the aforementioned transfer instruction has been received by the transfer instruction reception section 103 (Yes in S16), the control section 101 reads out the candidate transfer destination stored in the device storage section 110 (S271), and causes the display section 150 to display information indicating the device as the read-out candidate transfer destination (for example, by a display screen d12 shown as an example in FIG. 17 (S272).

Note that the control section 101 may cause the display section 150 to display the aforementioned display screen d4 (FIG. 8) when the aforementioned transfer instruction has been received by the transfer instruction reception section 103, and may cause the display section 150 to display the display screen d12 when a "Substitute printing-transfer" image im16 within the display screen d4 has been pressed by the user.

In this second embodiment, in response to the transfer of the transfer data including the facsimile data and the password, the device which has successful experiences in, for example, image forming, display, or storage of this facsimile data and the password is extracted and accumulated as a candidate transfer destination in the device storage section 110, thus making it possible, for example, to present, to the user, the highly reliable device capable of performing the image forming, display, or storage of this facsimile data, for example, when the transfer destination of the facsimile data is to be specified, or to transmit the transfer data to this highly reliable device.

This consequently makes it possible to more reliably ensure properly received facsimile data.

Subsequently, another mode of the fax transfer processing performed by the multifunction peripheral 1 according to the second embodiment will be described.

Figure 18:
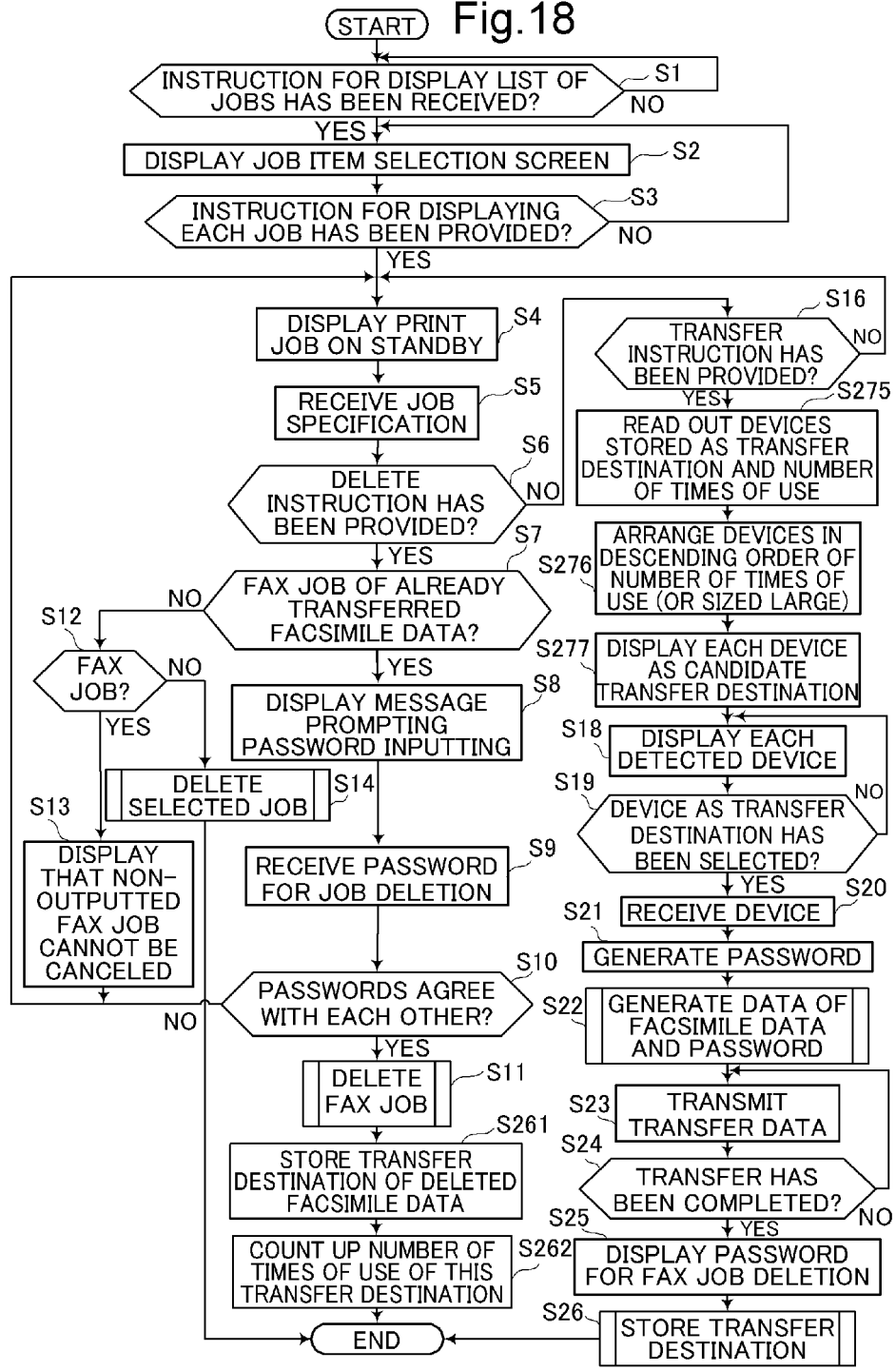
FIG. 18 is a flowchart showing the fax transfer processing performed by the multifunction peripheral according to the second embodiment.

FIG. 18 is a flowchart showing the fax transfer processing performed by the multifunction peripheral 1 according to the second embodiment.

The same processing as the fax transfer processing shown in FIG. 3 or FIG. 16 will be omitted from the description.

In this embodiment, after the device storage section 110 stored, as the candidate transfer destination, the device used for the transfer of the deleted facsimile data (S261), the number of times of use of this device for the transfer is counted up (S262).

Specifically, upon the storage of the device, which was used for the transfer of the deleted facsimile data, as the candidate transfer destination, the device storage section 110 stores the number of times of use of this device for the transfer.

Then upon reading out the candidate transfer destinations stored in the device storage section 110, the control section 101 also reads out the aforementioned number of times of use of each device (S275). The control section 101, based on the number of times of use of each device, varies a display modes of each device on the display screen of the display section 150 (S276).

For example, in a case where the candidate transfer destinations are the facsimile device, the printer, a personal computer E, and a personal computer D in descending order of the number of times of use, the control section 101 arranges images, showing the respective devices in the descending order of the number of times of use, vertically in an array as on a display screen d13 shown as an example in FIG. 19 (S276), and displays the display screen d13 on which the candidate transfer destinations are arranged as described above (S277).

Figure 20:
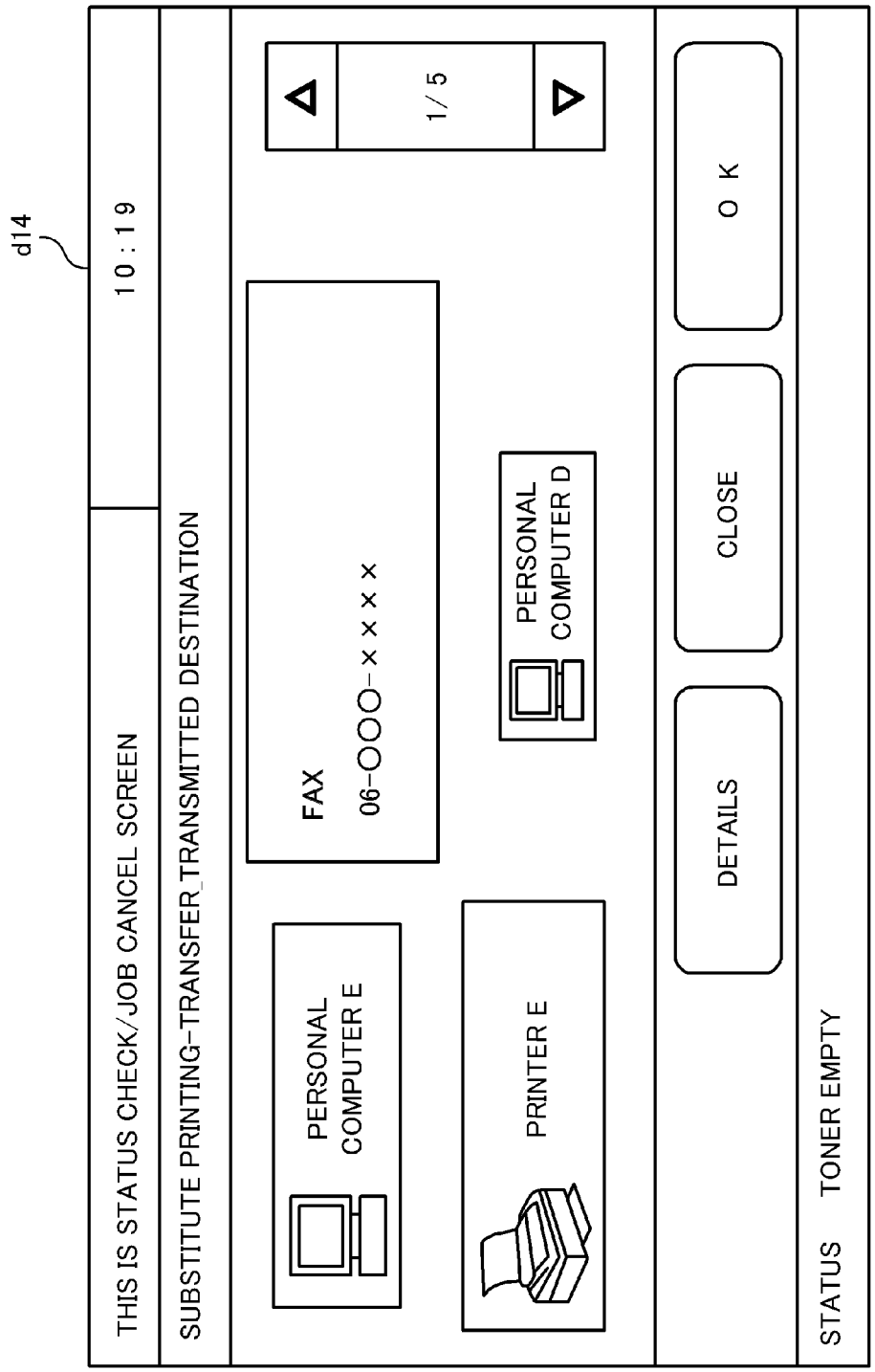
FIG. 20 is a diagram showing one example of a display screen of the display section.

Alternatively, a description will be given referring to, as an example, a similar case where the candidate transfer destinations are the facsimile device, the printer, the personal computer E, and the personal computer D in the descending order of the number of times of use. The control section 101, as in a display screen d14 shown in FIG. 20, may display images showing the respective devices in a manner such that the devices which are used more number of times become larger in size.

Consequently, the control section 101 can permit the user to recognize the devices, which can be the candidate transfer destinations, in descending order of higher experiences in past successful transfer data transfer and image forming, display, or storage performed without any problem.

Note that the fax transfer processing performed by the multifunction peripheral 1 according to the second embodiment is not limited to these modes.

For example, when the control section 101 reads out the devices stored as the aforementioned candidate transfer destinations in the aforementioned manner (S275), the data transfer control section 105 may transfer the transfer data to the predefined device (for example, the device having the predefined IP address without waiting for transfer destination specification by the user) from among those read-out.

This permits transfer of the transfer data to the highly reliable device where the image forming, display, or storage by the transfer data transfer is performed without depending on user's judgment, improving reliability in ensuring the received facsimile data.

Moreover, as described above, when the control section 101 reads out, from the device storage section 110, the devices stored as the aforementioned candidate transfer destinations (S261), if it also reads out the aforementioned number of times of use of each device, the data transfer control section 105 may transfer the transfer data to the device which is most frequently used.

This consequently permits transfer of transfer data to the most reliable device in which image forming, display, or storage by the transfer data transfer is performed without depending on user's judgment, further improving reliability in ensuring the received facsimile data.

Next, configuration of the multifunction peripheral 1 as the facsimile device according to other embodiments of this disclosure will be described.

Figure 21:
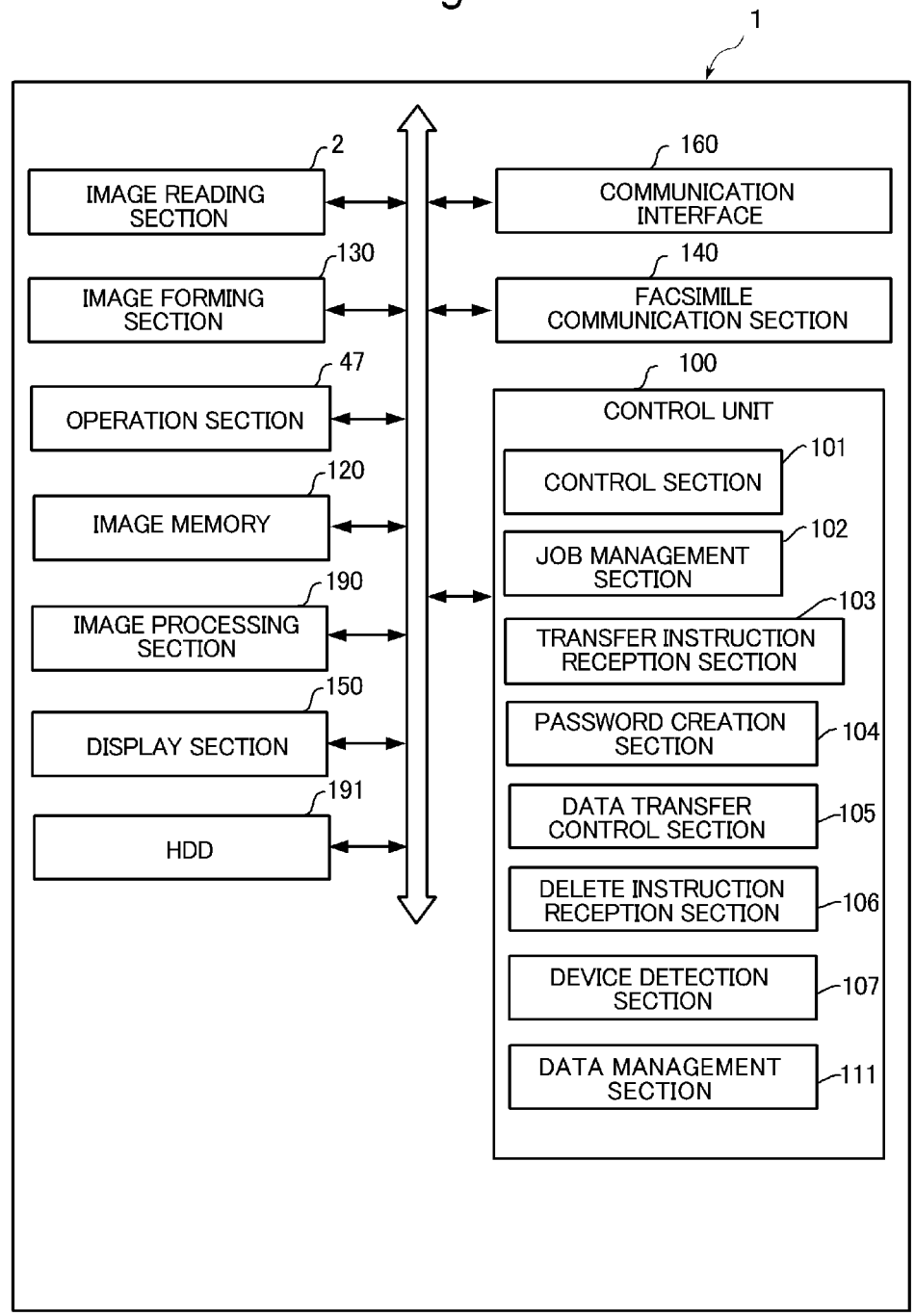
FIG. 21 is a block diagram showing an outline of inner configuration of a multifunction peripheral as a facsimile device according to third to eighth embodiments of this disclosure.

FIG. 21 is a block diagram showing an outline of inner configuration of the multifunction peripheral 1 as the facsimile device according to other embodiments of this disclosure. The same configuration as that of the multifunction peripheral 1 according to the embodiment shown in FIG. 2 will be omitted from the description. The configuration not specifically described is the same as that of the multifunction peripheral 1 according to the embodiment shown in FIG. 2.

The multifunction peripheral 1 according to the third to eighth embodiments further have, in addition to the configuration of the multifunction peripheral 1 according to the embodiment shown in FIG. 2, an HDD 191.

The image reading section 2, the facsimile communication section 140, and the communication interface 160 are examples of a data obtaining section in the claims.

The HDD (second storage section) 191 is, for example, a high-capacity hard disc drive, and stores data acquired through reading by the image reading section 2, data acquired from another computer by the communication interface 160, and further facsimile data moved from the image memory 120 by a data management section 111 to be described below.

The various pieces of data stored in the HDD 191 are used for image forming performed by the image forming section 130 and transmission to a different device by the communication interface 160.

In the third to fifth embodiments, a storage region named "Document box" is provided in the HDD 191, and the aforementioned various pieces of data are stored in this document box region.

Moreover, in the sixth to eighth embodiments, a storage region named "substitute printing-already transferred data saving box" is provided in the HDD 191, and stored in this substitute printing-already transferred data saving box region is facsimile data transferred to a different device by the data transfer control section 105 and the facsimile communication section 140 or the communication interface 160 in a manner described below.

The control section 101 is in charge of overall operation of the multifunction peripheral 1. For example, the control section 101 reads out, in page order, pages of original data read out by the image reading section 2 for fax transmission and temporarily stored in the image memory 120, and causes the facsimile communication section 140 to perform fax transmission to a destined facsimile device specified through operation of the operation section 47 by the user.

Moreover, the control section 101 reads out, in page order, the facsimile data received by the facsimile communication section 140 and temporarily stored in the image memory 120, and causes the image forming section 130 to perform image forming (printing). The data transfer control section 105, the facsimile communication section 140, and the communication interface 160 are examples of the data transfer section in the claims.

The data management section 111 moves, to the HDD (second storage section) 191, a fax job transferred to the different device by the data transfer control section 105 and excluded from the job management by the job management section 102.

Specifically, when the facsimile data and its password have become already transferred by the data transfer control section 105 as described above, the job management section 102 excludes the fax job of this already transferred facsimile data from the target of the job management.

Here, to perform processing according to the third to fifth embodiments of fax transfer processing to be described below, the facsimile data is saved as a result of the aforementioned movement into the document box region held by the HDD 191.

Moreover, to perform processing of the fax transfer processing according to the sixth to eighth embodiments to be described below, the facsimile data is saved as a result of the aforementioned movement into the substitute printing-already transferred data saving box held by the HDD 191.

This substitute printing-already transferred data saving box is a storage region into which only the already transferred facsimile data described above is saved.

In the third to fifth embodiments, the delete instruction reception section 106, for each data stored in the document box region, which includes the facsimile data moved to the document box region of the HDD 191 by the data management section 111, receives from the user a delete instruction by specification of the facsimile data targeted for deletion and password inputting.

In the sixth to eighth embodiments, the delete instruction reception section 106, for the facsimile data moved to the region of the substitute printing-already transferred data saving box of the HDD 191 by the data management section 111, receives from the user a delete instruction by specification of the facsimile data targeted for deletion and password inputting.

These delete instructions are inputted through operation of the operation section 47 by the user.

In the third to fifth embodiments, when the delete instruction has been received by the delete instruction reception section 106, the data management section 111 determines whether or not this facsimile data targeted for the deletion by this delete instruction is facsimile data moved to the document box region as a result of the aforementioned movement.

Then if the facsimile data targeted for the deletion is a result of this movement, the data management section 111 compares a password indicated by this delete instruction with the password created by the password creation section 104 in correspondence with the facsimile data targeted for the deletion, and under condition that these passwords agree with each other, deletes the facsimile data indicated by this delete instruction from the document box.

Moreover, in the sixth to eighth embodiments, the data management section 111 compares the password indicated by this delete instruction with the password created by the password creation section 104 in correspondence with the facsimile data targeted for the deletion, and under the condition that these passwords agree with each other, deletes the facsimile data indicated by this delete instruction from the substitute printing-already transferred data saving box.

Next, the third embodiment of the fax transfer processing performed by the multifunction peripheral 1 will be described.

Figure 22:
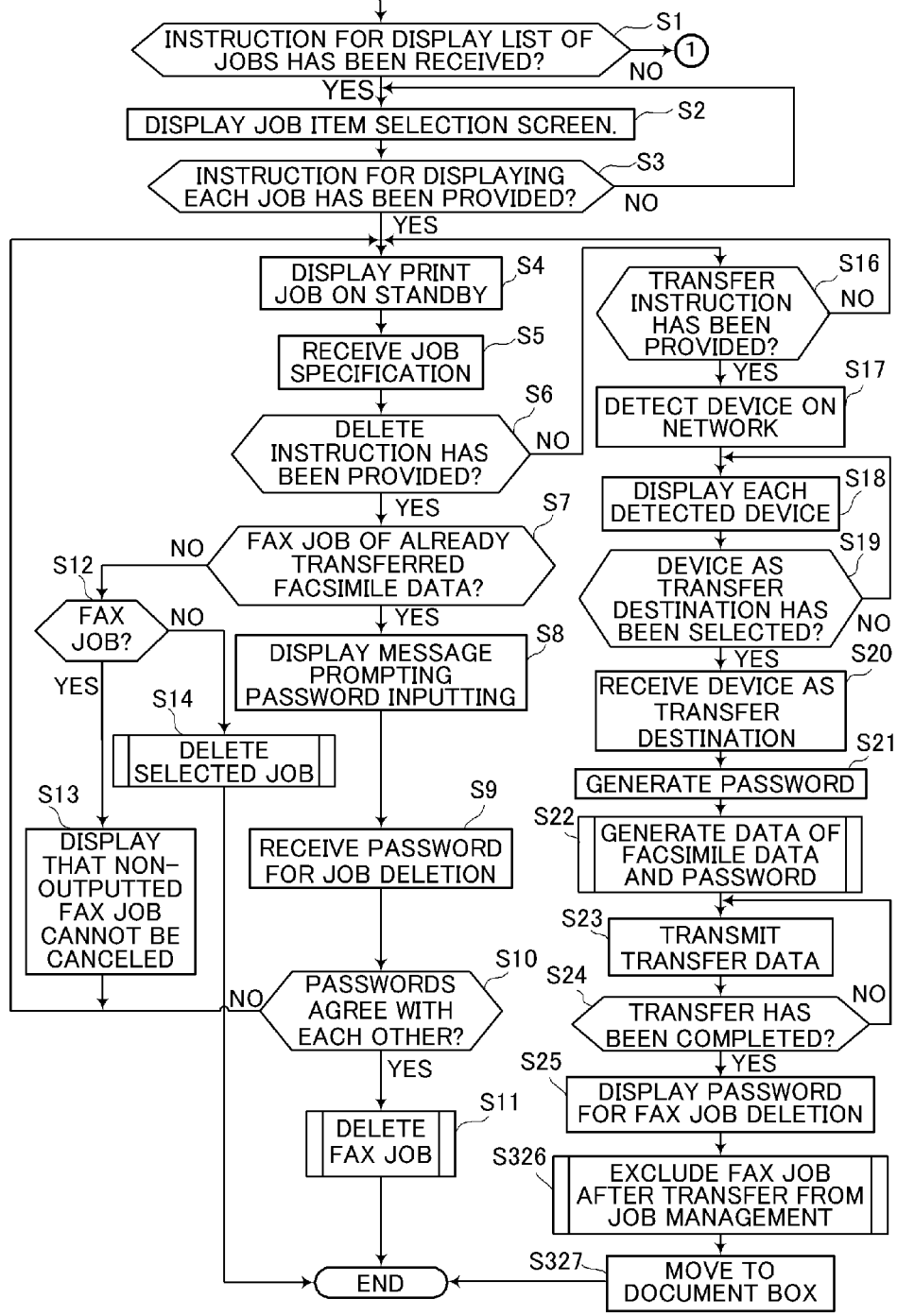
FIG. 22 is a flowchart showing the third embodiment of the fax transfer processing performed by the multifunction peripheral.
Figure 23:
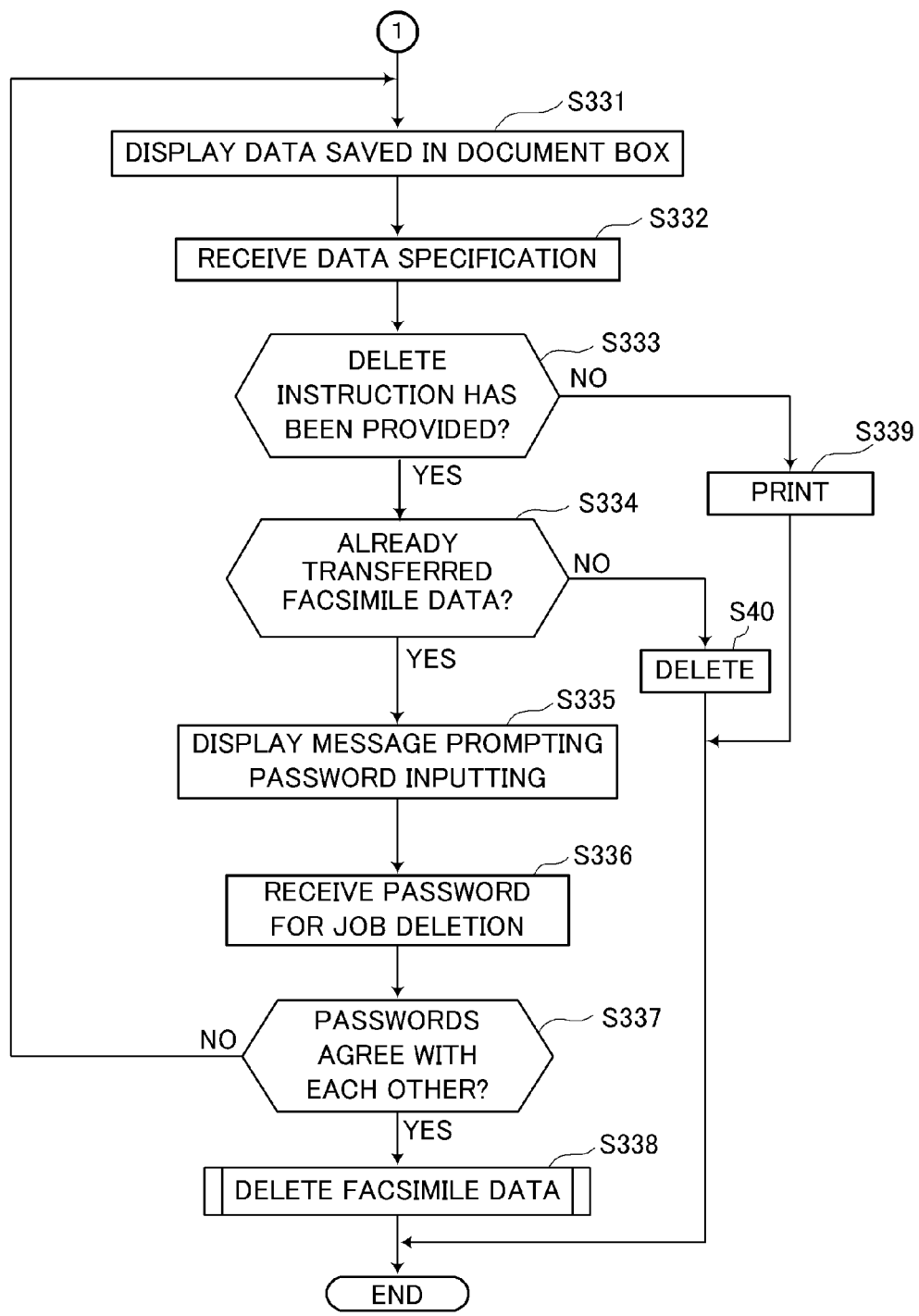
FIG. 23 is a flowchart showing the third embodiment of the fax transfer processing performed by the multifunction peripheral.

FIGS. 22 and 23 are flowcharts showing the third embodiment of the fax transfer processing performed by the multifunction peripheral 1.

Figure 24:
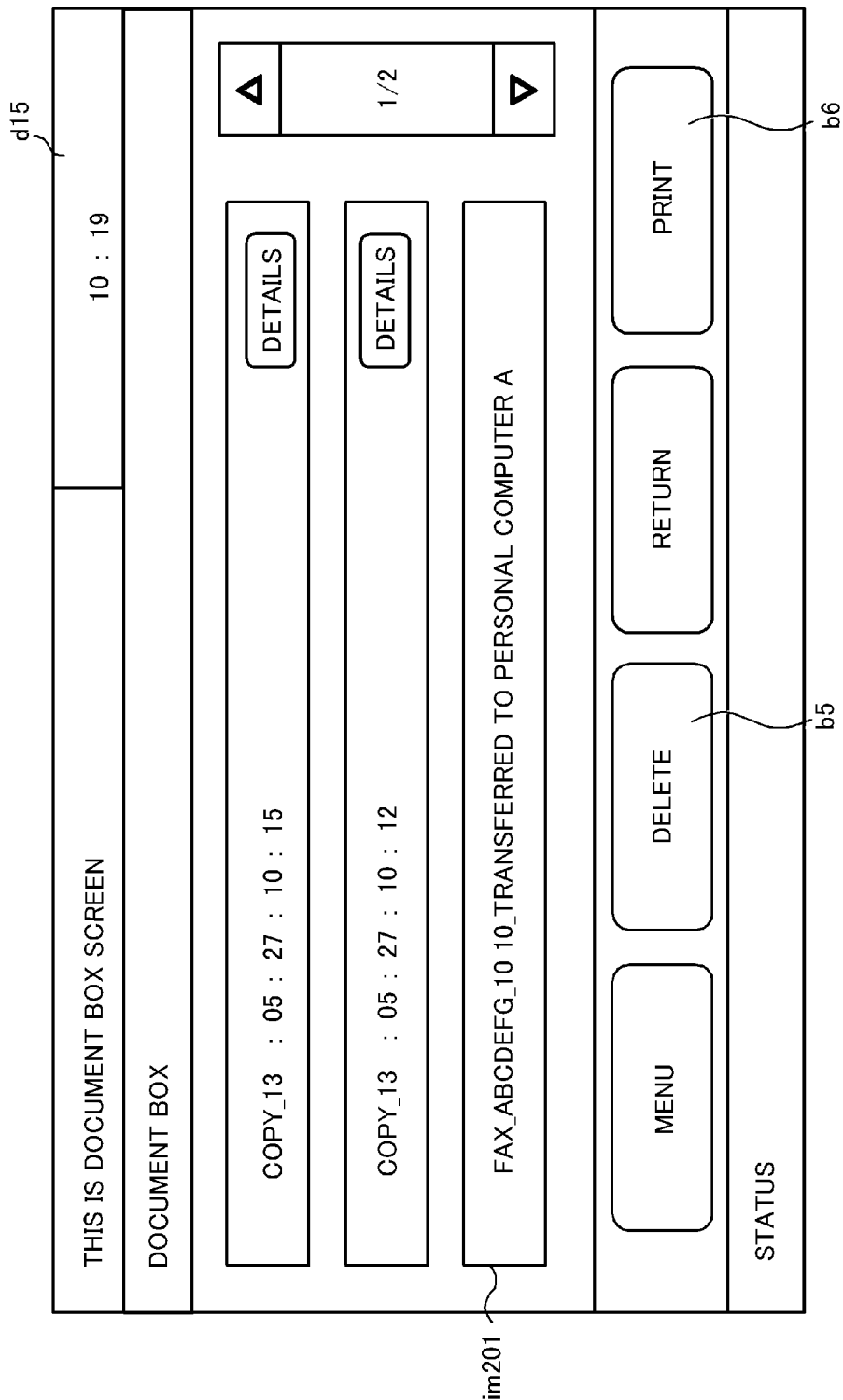
FIG. 24 is a diagram showing one example of a display screen of the display section.
Figure 25:
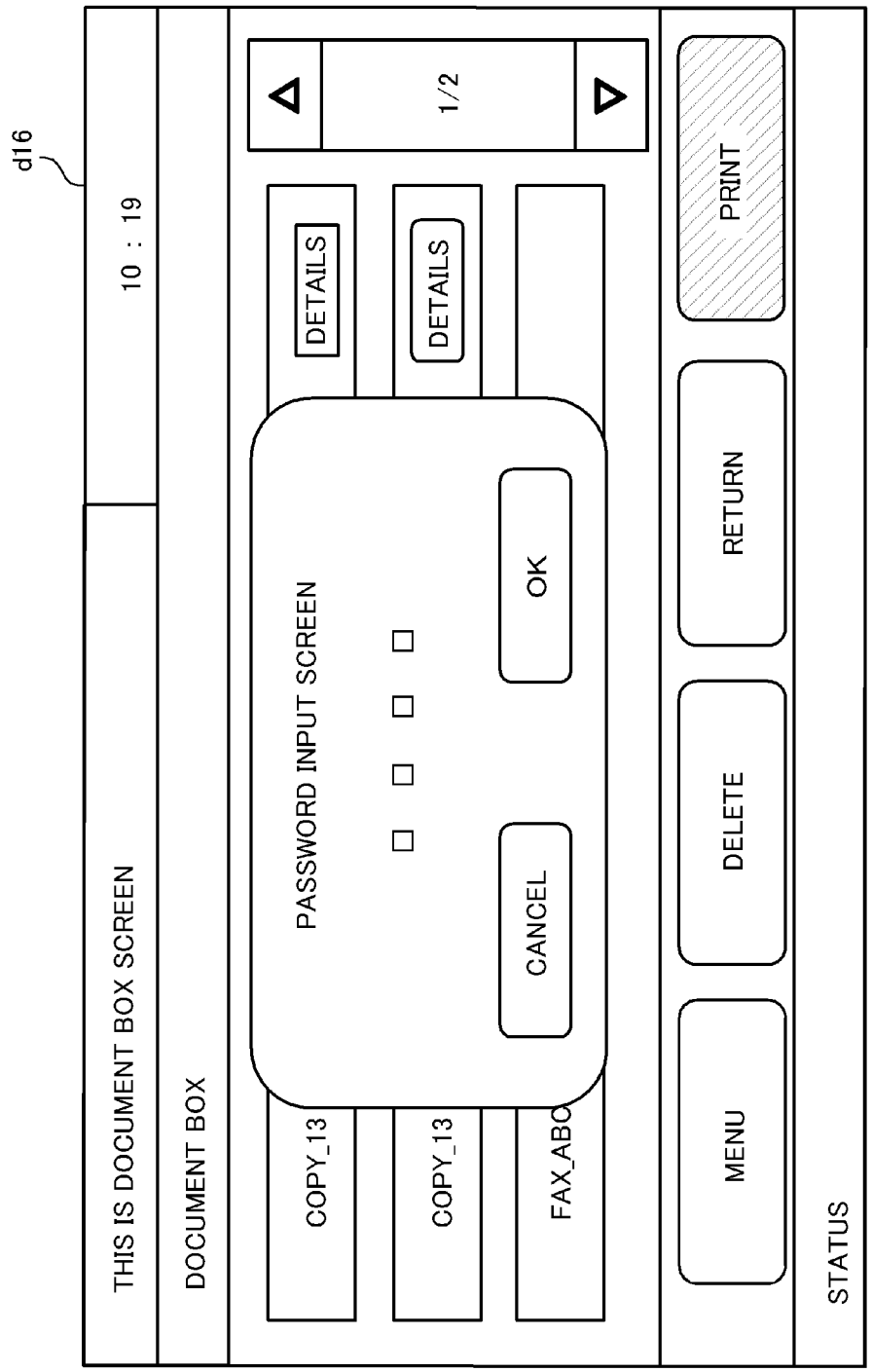
FIG. 25 is a diagram showing one example of a display screen of the display section.

FIGS. 24 and 25 are diagrams showing examples of a display screen of the display section 150.

The same processing as the processing described in the fax transfer processing according to the first or second embodiment will be omitted from illustration and the description.

The processing S1 to S25 in the third embodiment are the same processing as that of the first embodiment.

As is the case with the fax transfer processing according to the first embodiment, after end of data transfer processing (S24) and display processing (S25) performed by the data transfer control section 105, the job management section 102 excludes the data already subjected to this transfer from the target of the aforementioned job management (S326).

Then the data management section 111 moves the facsimile data of this fax job excluded from the job management by the job management section 102 to the document box region of the HDD 191 (S327).

In S1 described above, upon user's pressing of a "Document box" button B5 of the operation section 47 shown as an example in FIG. 5, based on this press operation, the control section 101 receives a display instruction for displaying a list of data stored in the document box region of the HDD 191 (NO in S1).

At this point, the control section 101 causes the display section 150 to display a display screen d15 showing the data saved in the document box region, as shown as an example in FIG. 24 (S331).

Upon user's pressing of the image indicating the desired data when this display screen d15 is displayed, by the touch panel function of the display section 150, an instruction for specifying the data corresponding to this image is received (S332).

For example, upon pressing of the image im201 showing the facsimile data, by the touch panel function of the display section 150, an instruction for specifying the facsimile data corresponding to this image im201 is received.

Further, upon user's pressing of the "Delete" button b5, a delete instruction corresponding to the "Delete" button b5 is inputted by the aforementioned touch panel function, and received by the data management section 111 (YES in S333).

This delete instruction is an instruction for deleting the specified facsimile data described above from the aforementioned document box region.

At this point, the data management section 111 determines whether or not the job targeted by this delete instruction is the facsimile data already transferred in S23 described above (S334).

At this point, the data management section 111 determines whether or not this facsimile data is facsimile data for the already transferred fax job described above.

If the data management section 111 has determined that it is the already transferred facsimile data (YES in S334), for example, by displaying the display screen d16 shown as an example in FIG. 25, the control section 101 causes the display section 150 to display a message prompting the user to input a password (S335).

Here, upon password inputting, for example, through operation of the operation section 47 by the user, the delete instruction reception section 106 receives it (S336).

At this point, the data management section 111 determines whether or not this inputted password agrees with the password created by the password creation section 104 in S21 for the fax job of the facsimile data targeted for the deletion (S337).

If the data management section 111 has determined that this inputted password does not agree with the password created by the password creation section 104 in S21 (NO in S337), the data management section 111 does not delete the facsimile data targeted for the deletion by the delete instruction and the processing returns to S331, and the control section 101 causes the display section 150 to display the display screen d11 (FIG. 15) again.

On the other hand, if the data management section 111 has determined that this inputted password agrees with the password created by the password creation section 104 in S21 (YES in S337), the data management section 111 deletes, from the document box region, the facsimile data targeted for the deletion by the delete instruction (S338). After S338, the processing ends.

In S333, if the "Delete" button b5 is not pressed by the user, for example, upon pressing of a "Print" button b6, a print instruction corresponding to the "Print" button b6 is inputted by the aforementioned touch panel function (NO in S333).

The control section 101 causes the image forming section 130 to perform image forming of the specified facsimile data described above (S339). Then the processing ends.

Moreover, in S334, if the data management section 111 has determined that the facsimile data targeted by the delete instruction is not the facsimile data already transferred in S23 (NO in S334), the data targeted by this delete instruction is deleted (S40).

As a result of this, the fax job of the facsimile data transferred in S23 described above is excluded from the management by the job management section 102, and this transferred facsimile data is stored into the document box region of the HDD 191, thus reducing loads of processing for the job management by the job management section 102.

Moreover, when the delete instruction reception section 106 has received from the user the instruction for deleting the facsimile data moved to the document box region, the data management section 111 determines whether or not the facsimile data targeted for deletion is the one stored as a result of the aforementioned movement, and differentiates it from other pieces of data stored in the document box region, that is, the pieces of data other than the facsimile data stored as a result of the aforementioned movement, and deletes the facsimile data stored as a result of the aforementioned movement under the condition that the aforementioned passwords agree with each other, thus avoiding a situation in which the transferred facsimile data described above is accidentally deleted without user's recognition which of the data stored in the document box region corresponds to this facsimile data, which can protect and reliably ensure this facsimile data.

By protecting this facsimile data from the accidental deletion as described above, this facsimile data is ensured even when this facsimile data is excluded from the job management as described above.

Therefore, with the multifunction peripheral 1 according to this embodiment, it is possible to reliably ensure properly received facsimile data while preventing storage region shortage as a result of facsimile data saving in this multifunction peripheral 1 as a reception source of the facsimile data and also reducing processing load.

Figure 26:
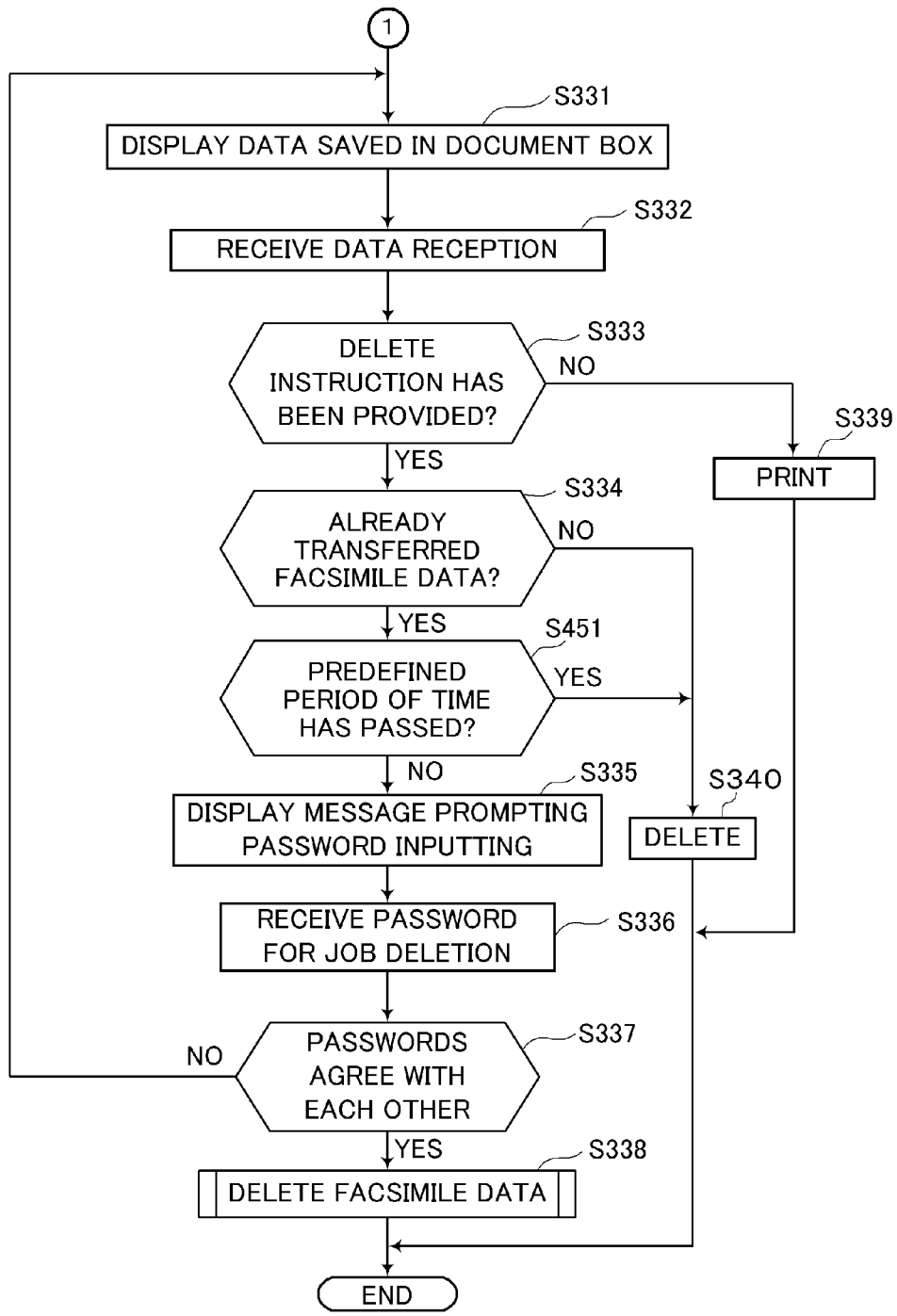
FIG. 26 is a flowchart showing the fourth embodiment of the fax transfer processing performed by the multifunction peripheral.

Next, the fourth embodiment of the fax transfer processing performed by the multifunction peripheral 1 will be described. FIG. 26 is a flowchart showing the fourth embodiment of the fax transfer processing performed by the multifunction peripheral 1.

The same processing as those of the first to third embodiments will be omitted from illustration and the description.

In the fourth embodiment, in S334 described above, when the data management section 111 has determined that the facsimile data targeted by the delete instruction is facsimile data for the already transferred fax job (YES in S334), the data management section 111 determines whether or not a predefined period of time (for example, 30 days) has passed from a time point at which the aforementioned facsimile data targeted for deletion was moved to the document box region (S451).

If the data management section 111 has determined that this predefined period of time has passed (YES in S451), based on the delete instruction received in S332, without the aforementioned condition that the passwords agree with each other, the facsimile data targeted for the deletion by the delete instruction is deleted from the document box region (S340).

On the other hand, if the data management section 111 determines that this predefined period of time has not yet passed (NO in S451), with the condition that the aforementioned passwords agree with each other, processing S335 through S338 for deleting this facsimile data is performed.

As a result, for a given period of time after the facsimile data reception, with the aforementioned condition that the passwords agree with each other, while protecting the received facsimile data from accidental deletion, the facsimile data which has not yet been outputted even after the passage of the given period of time and which is assumed to be insignificant is deleted without the aforementioned condition that the passwords agree with each other, preventing a state in which the storage region is full.

Next, the fifth embodiment of the fax transfer processing performed by the multifunction peripheral 1 will be described.

Figure 27:
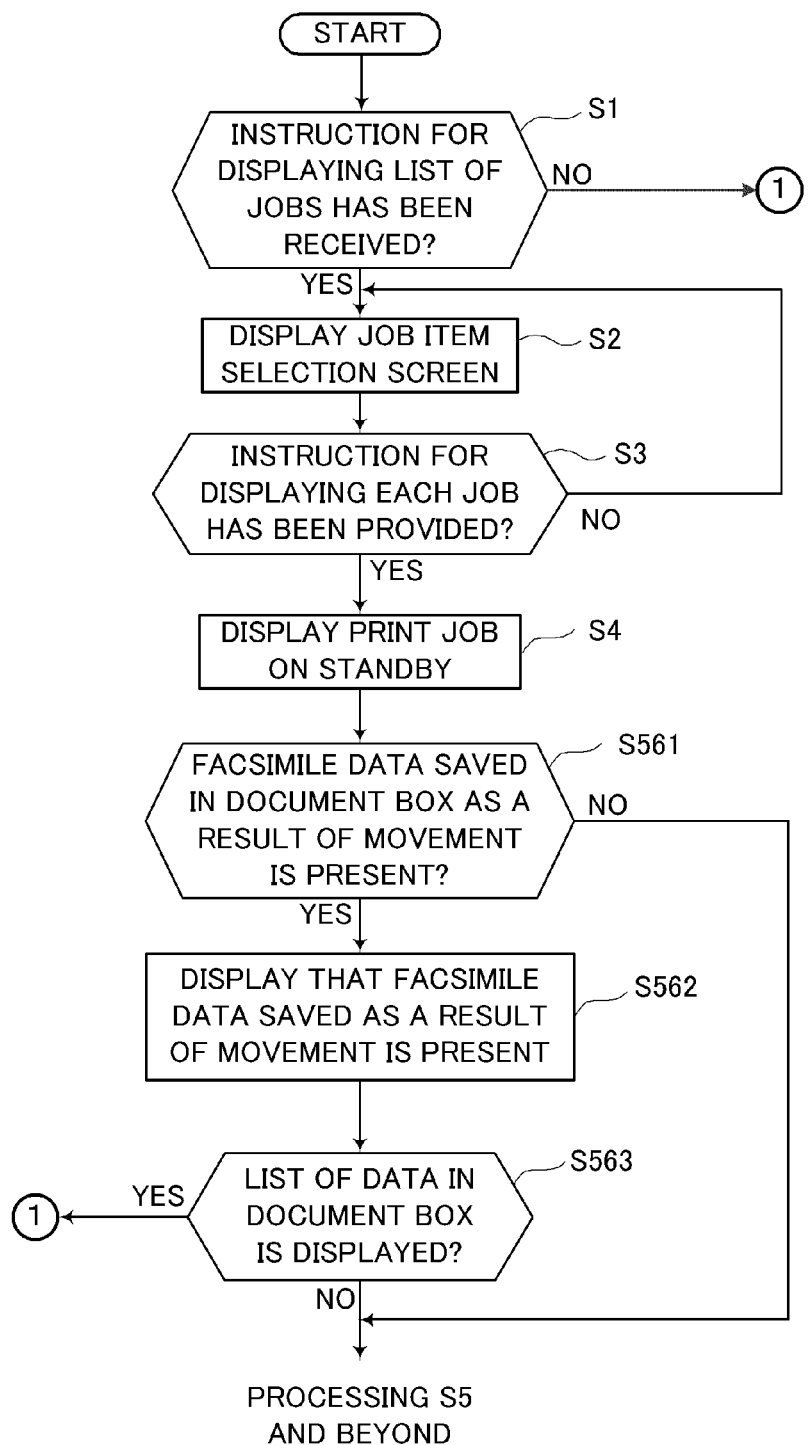
FIG. 27 is a flowchart showing the fifth embodiment of the fax transfer processing performed by the multifunction peripheral.

FIG. 27 is a flowchart showing the fifth embodiment of the fax transfer processing performed by the multifunction peripheral 1.

Figure 28:
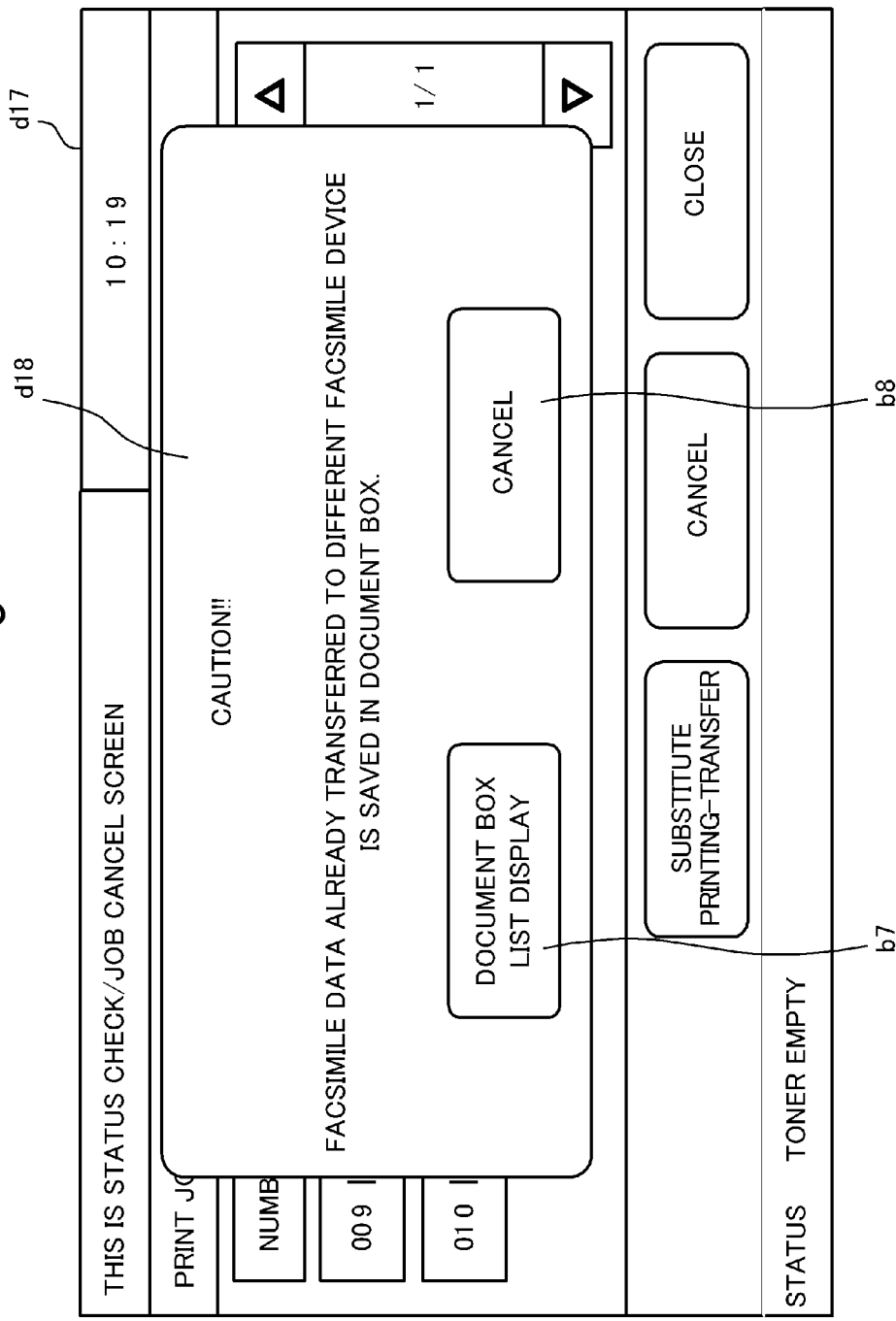
FIG. 28 is a diagram showing one example of a display screen of the display section.

FIG. 28 is a diagram showing one example of a display screen of the display section 150. The same processing as those of the first to fourth embodiments will be omitted from illustration and the description.

In the fifth embodiment, a display instruction for displaying each of the jobs in execution or on standby is inputted from the user (YES in S3), and when the control section 101 causes the display section 150 to display a list of the jobs on standby, for example, by the display screen d3 shown in FIG. 8 (S4), the control section 101 determines whether or not any facsimile data moved to the document box region by the data management section 111 after the aforementioned transfer is present (S561), and if it has determined that the facsimile data saved in the document box region as a result of this movement is present (YES in S561), the control section 101 causes the display section 150 to display a message that facsimile data moved to the document box region and saved by the data management section 111 after the aforementioned transfer is present (S562).

For example, like a display screen d17 shown as an example in FIG. 28, the control section 101 causes display of a window screen d18 superposed on the display screen indicating the job list.

Figure 15:
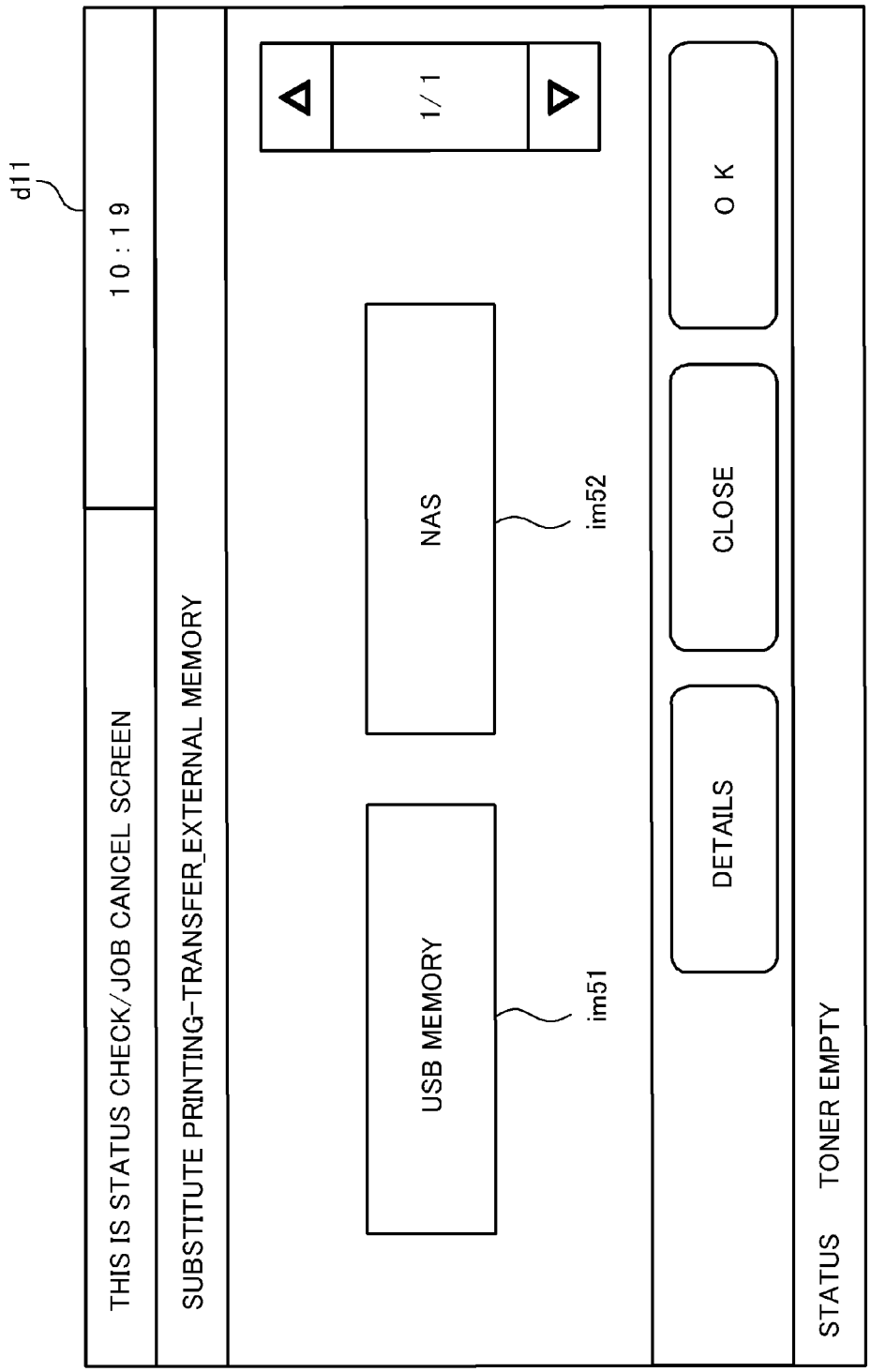
FIG. 15 is a diagram showing one example of a display screen of the display section.

Here, upon user's pressing of a "Document box list display" button b7, the control section 101 receives, from the user, an instruction for displaying a list of data saved in the document box in correspondence with the "Document box list display" button b7 (YES in S563), and causes the display section 150 to display the list of data saved in the document box region, for example, by the display screen d11 shown in FIG. 15 (S331).

Specifically, the processing proceeds to S331, and then processing S332 and beyond are performed.

On the other hand, upon user's pressing of a "Cancel" button b8, the control section 101 receives, from the user, an instruction for not displaying this message corresponding to the "Cancel" button b8 (NO in S63), and causes the display section 150 to display a display screen like the display screen d3 of FIG. 8 showing the list of jobs on standby described above (S5).

Specifically, the processing proceeds to S5, and then the processing S6 and beyond are performed.

According to this fifth embodiment, upon check of the jobs on standby, the user can get to know the presence of the facsimile data saved in the document box region as a result of the aforementioned movement.

Moreover, when the message indicating the presence of the facsimile data saved in the document box region as a result of the aforementioned movement is being displayed, the control section 101, in accordance with an instruction from the user, causes the display section 150 to display the list of data saved in the document box region, thus making it possible for the user to immediately view the list of the pieces of data saved in the document box without performing complicated operation, permitting deletion or printing of this facsimile data.

Next, the sixth embodiment of the fax transfer processing performed by the multifunction peripheral 1 will be described.

Figure 29:
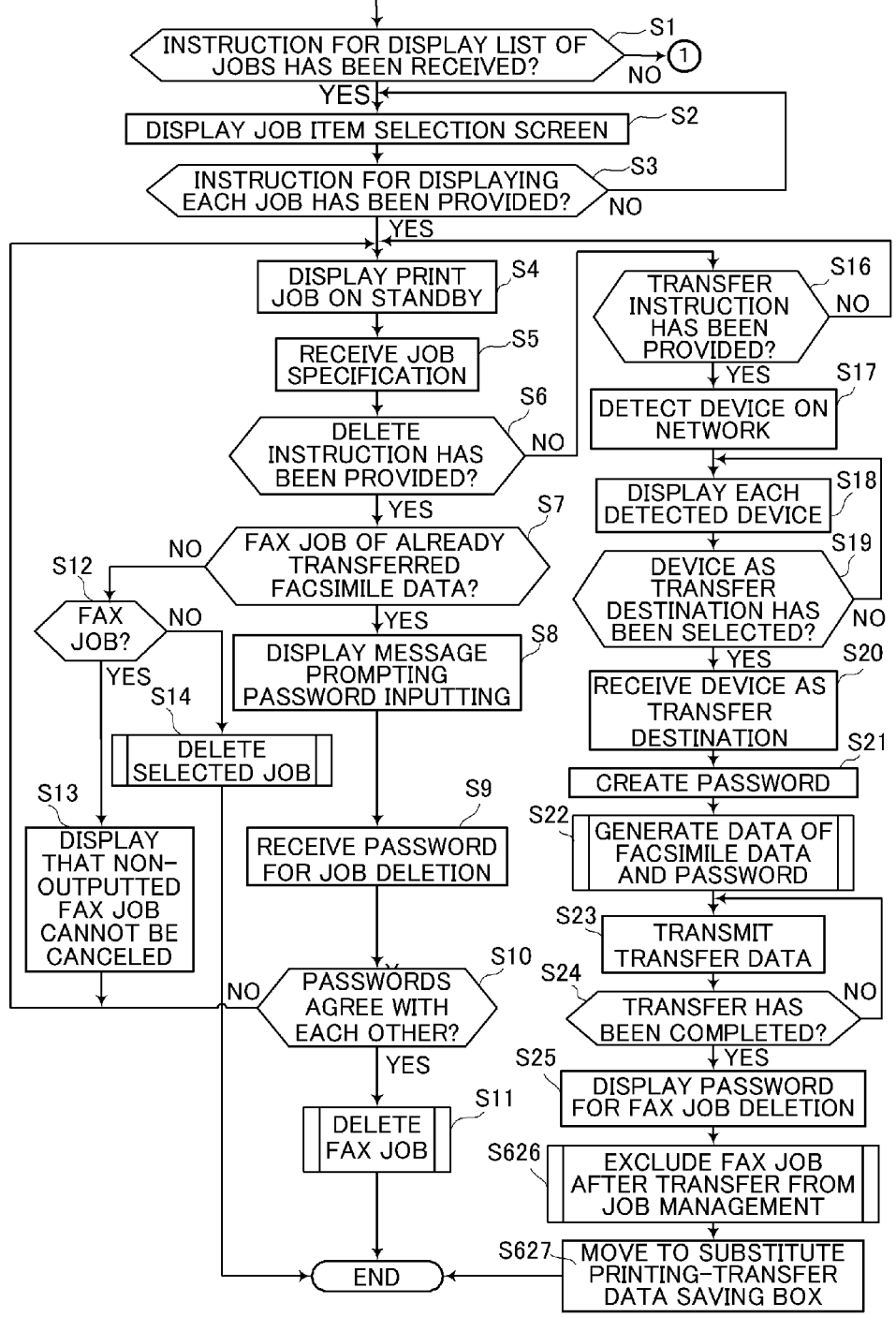
FIG. 29 is a flowchart showing the sixth embodiment of the fax transfer processing performed by the multifunction peripheral.
Figure 30:
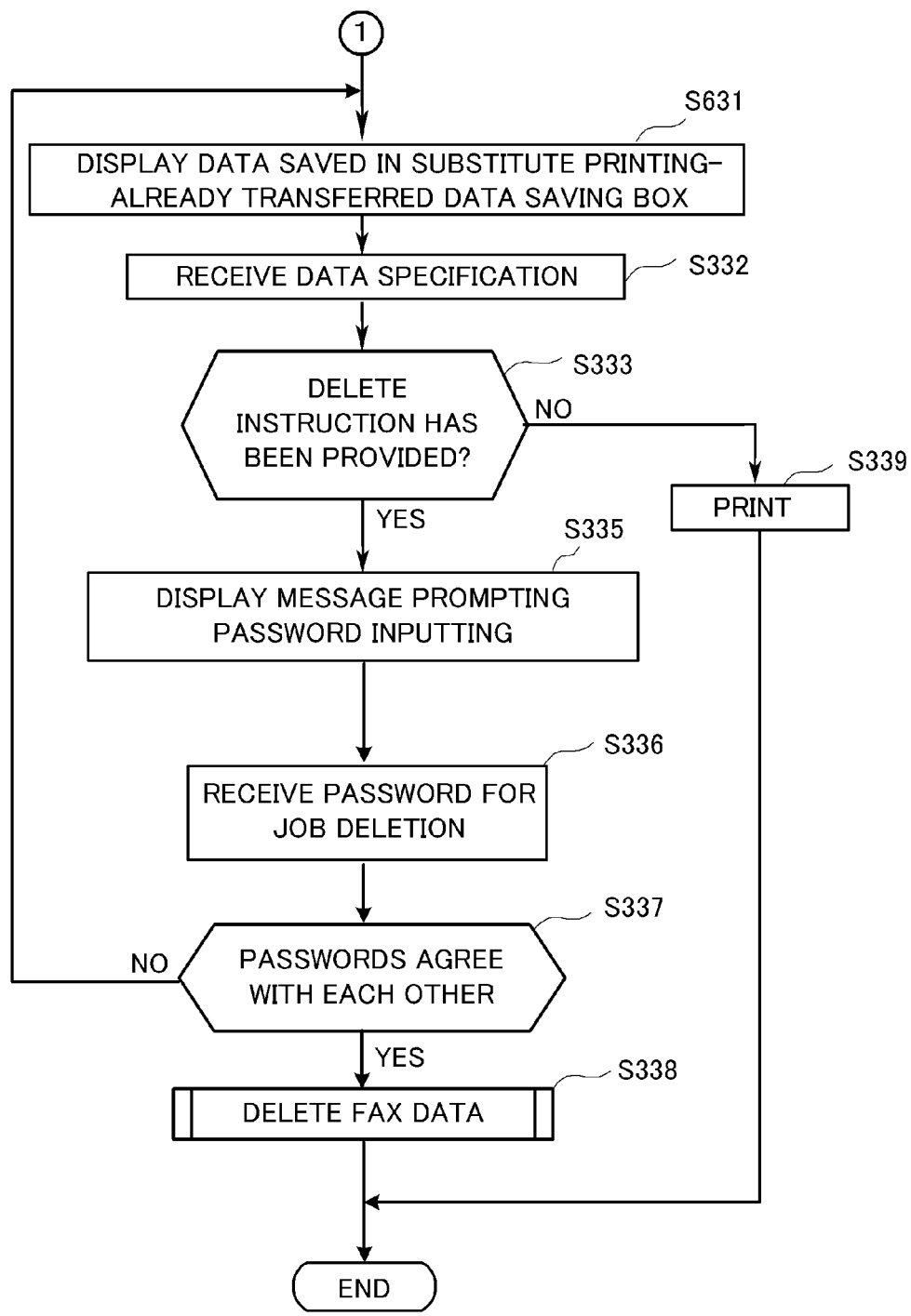
FIG. 30 is a flowchart showing the sixth embodiment of the fax transfer processing performed by the multifunction peripheral.

FIGS. 29 and 30 are flowcharts showing the sixth embodiment of the fax transfer processing performed by the multifunction peripheral 1. The same processing as that of the third embodiment will be omitted from illustration and the description. For the sixth embodiment, processing S1 through S25 are the same as those of the first embodiment.

As is the case with the fax transfer processing according to the first embodiment, after end of the data transfer processing (S24) and the display processing (S25) performed by the data transfer control section 105, the job management section 102 excludes this transferred data from the target of the aforementioned job management (S626).

Then the data management section 111 moves the facsimile data of this fax job excluded from the job management by the job management section 102 to the substitute printing-already transferred data saving box region of the HDD 191 (S627). This substitute printing-already transferred data saving box region is a storage region in which only the facsimile data of the fax job excluded from this job management is saved. That is, the data management section 111 collects and saves only the facsimile data excluded from the job management.

Moreover, in S1 described above, upon user's pressing of the "Document box" button B5 of the operation section 47 shown as an example in FIG. 5, based on this press operation, the control section 101 receives a display instruction for displaying a list of data stored in the substitute printing-already transferred data saving box region of the HDD 191 (NO in S1).

Then as is the case with the third embodiment, the data management section 111 receives an instruction for deleting the data stored in the substitute printing-already transferred data saving box region of the HDD 191.

This delete instruction is an instruction for deleting the specified facsimile data described above from the aforementioned substitute printing—already transferred data saving box region. In the aforementioned substitute printing-already transferred data saving box region, only the job of facsimile substitute printing or the already transferred job is present, and thus the processing of step S334 of the third embodiment is not required.

The other processing, that is, display promoting password inputting (S335), password reception (S336), judgment whether or not the passwords agree with each other (S337), and deletion when the passwords agree with each other (S338) are the same as those of the third embodiment.

Accordingly, when the delete instruction reception section 106 has received, from the user, an instruction for deleting the facsimile data moved to the substitute printing-already transferred data saving box region, the data management section 111 deletes the facsimile data stored as a result of this movement under condition that the passwords agree with each other, thus avoiding a situation in which the user accidentally deletes this facsimile data, which makes it possible to protect and reliably ensures this facsimile data.

By protecting this facsimile data from accidental deletion as described above, even when this facsimile data is excluded from the job management as described above, this facsimile data is ensured.

Therefore, with the multifunction peripheral 1 according to this embodiment, it is possible to reliably ensure properly received facsimile data while preventing storage region shortage as a result of facsimile data saving in the multifunction peripheral 1 as a reception source of the facsimile data and also reducing processing loads.

Figure 31:
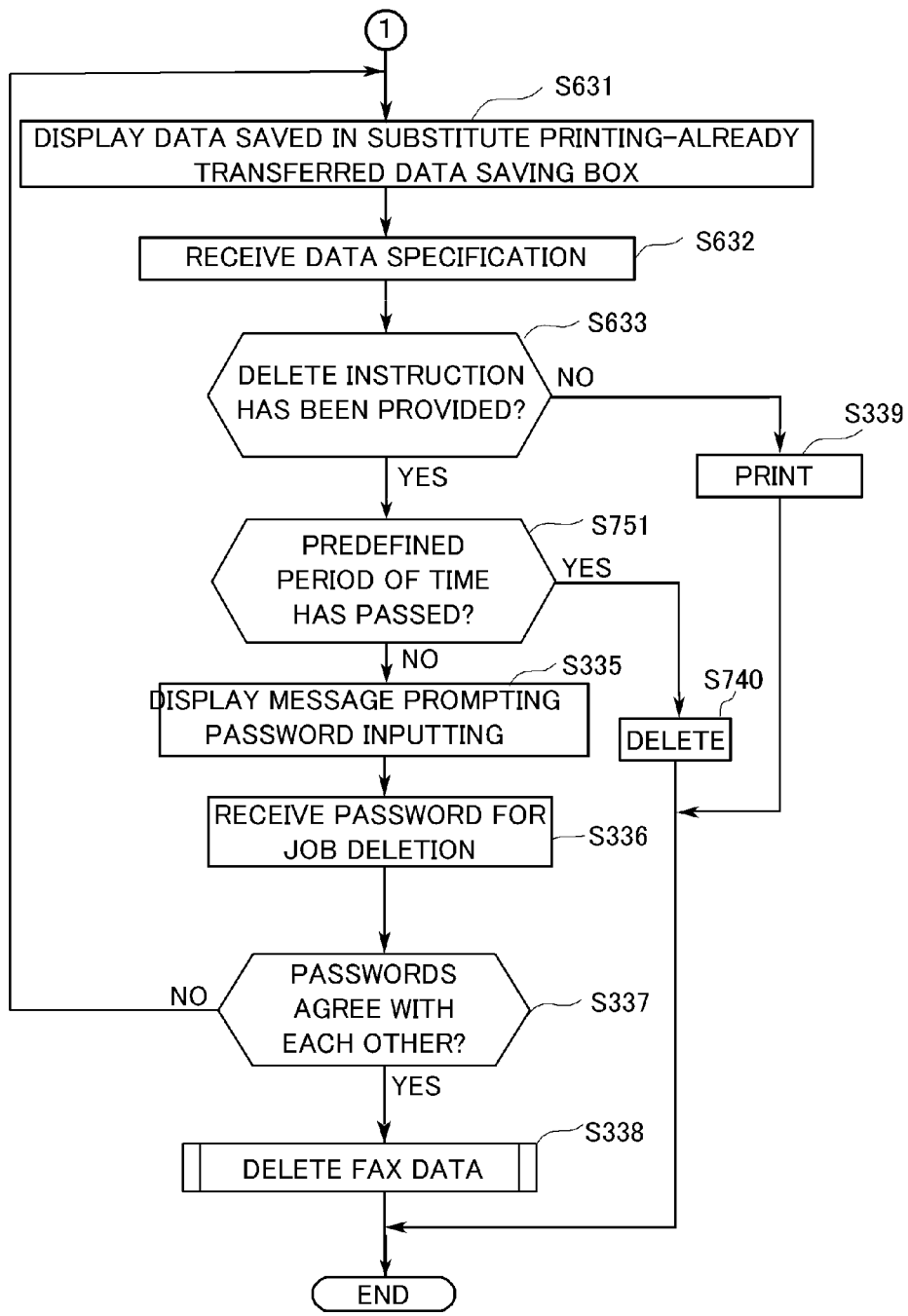
FIG. 31 is a flowchart showing the seventh embodiment of the fax transfer processing performed by the multifunction peripheral.

Next, the seventh embodiment of the fax transfer processing performed by the multifunction peripheral 1 will be described. FIG. 31 is a flowchart showing the seventh embodiment of the fax transfer processing performed by the multifunction peripheral 1. The same processing as that of the first to fifth embodiments is omitted from illustration and the description.

In the seventh embodiment, in S333 described above, when the data management section 111 has received an instruction for deleting the facsimile data by the user (YES in S633), the data management section 111 determines whether or not a predefined period of time (for example, 30 days) has passed from a time point at which the facsimile data targeted for the aforementioned deletion was moved to the substitute printing-already transferred data saving box region (S751). If the data management section 111 determines that the predefined period of time has passed (YES in S751), based on the delete instruction received in S633, the data management section 111 deletes the facsimile data targeted for the deletion by this delete instruction from the substitute printing-already transferred data saving box region without the aforementioned condition that the passwords agree with each other (S740).

On the other hand, when it has been determined that the predefined period of time has not yet passed (NO in S751), the data conversion section 108 performs the processing S335 through S338 of deleting this facsimile data under the aforementioned condition that the passwords agree with each other.

As a result, for a given period of time since reception of the facsimile data, under the aforementioned condition that the passwords agree with each other, the facsimile data which has not yet been outputted even after passage of the given period of time and which is assumed to be insignificant is deleted without the aforementioned condition that the passwords agree with each other, preventing a state in which the storage region is full.

Next, the eighth embodiment of the fax transfer processing performed by the multifunction peripheral 1 will be described. FIG. 32 is a flowchart showing the eighth embodiment of the fax transfer processing performed by the multifunction peripheral 1. The same processing as that of the first to seventh embodiments is omitted from illustration and the description.

In the eighth embodiment, the user inputs a display instruction for displaying jobs in execution or on standby (YES in S3), when the control section 101 causes the display section 150 to display a list of the jobs on standby, for example, by the display screen d3 shown in FIG. 8 (S4), the control section 101 determines whether or not the facsimile data moved to the substitute printing-already transferred data saving box region by the data management section 111 after the aforementioned transfer is present (S861), and if it has been determined that the facsimile data saved in the substitute printing-already transferred data saving box region as a result of this movement is present (YES in S861), the control section 101 causes the display section 150 to display a message that the facsimile data moved to and saved in the substitute printing-already transferred data saving box region by the data management section 111 after the aforementioned transfer is present (S862). For example, the control section 101 causes the display section 150 to display the display screen d15 shown in FIG. 33

Here, upon user's pressing of the "Substitute printing-already transferred data saving box list display" button b9, the control section 101 receives, from the user, an instruction for displaying a list of data saved in the substitute printing-already transferred data saving box corresponding to the "Substitute printing-already transferred data saving box list display" button b9 (YES in S863), and causes the display section 150 to display a list of data saved in the substitute printing-already transferred data saving box region (S331). Specifically, the processing proceeds to S631, and then processing S332 and beyond are performed.

On the other hand, upon user's pressing of the "Cancel" button b8, the control section 101 receives, from the user, an instruction for not displaying this message corresponding to the "Cancel" button b10 (NO in S863), and causes the display section 150 to display a display screen showing a list of the jobs on standby described above (S4). Specifically, the processing proceeds to S4 and then the processing S5 and beyond are performed.

According to the eighth embodiment, upon check of the jobs on standby, the user can recognize the presence of facsimile data saved in the substitute printing-already transferred data saving box region as a result of the aforementioned movement.

Moreover, when the message indicating the presence of the facsimile data saved in the substitute printing-already transferred data saving box region as a result of the aforementioned movement is displayed, in accordance with the instruction from the user, the control section 101 causes the display section 150 to display the list of the data saved in the substitute printing-already transferred data saving box region, thus making it possible for the user to immediately view the list of each data saved in the substitute printing-already transferred data saving box without any complicated operation and to delete or print this facsimile data.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A facsimile device comprising:
a facsimile data reception section receiving facsimile data from a different facsimile device;
a storage section storing the facsimile data received by the facsimile data reception section;
a job management section performing fax job management for the stored facsimile data;
a transfer instruction reception section receiving, from a user, a transfer instruction for transferring the facsimile data managed by the job management section to a different device;
a password creation section creating a password in correspondence with facsimile data targeted for transfer when the transfer instruction reception section has received the transfer instruction;
a data transfer section transferring, to the different device, transfer data including the password created by the password creation section and the facsimile data targeted for the transfer;
a data conversion section converting the transfer data into a predefined standard data format;
an advisability detection section detecting whether or not the device indicated by the transfer instruction is an image forming apparatus capable of image forming in the standard data format;
a delete instruction reception section receiving, from the user, a delete instruction by specification of a fax job targeted for deletion and password inputting;
when the delete instruction reception section has received the delete instruction, the job management section compares a password indicated by the delete instruction with the password created in correspondence with the facsimile data of the fax job targeted for the deletion by the delete instruction, and deletes the fax job indicated by the delete instruction under condition that the passwords agree with each other;
wherein, when the advisability detection section has determined that the device indicated by the transfer instruction is the image forming apparatus capable of image forming in the standard data format, the data transfer section further performs transfer of the transfer data to the image forming apparatus in the standard data format, and when the advisability detection section has determined that the device is the image forming apparatus not capable of image forming in the standard data format, the data transfer section transmits the transfer data targeted for the transfer by the transfer instruction to a predefined server on the Internet, and transmits, from the server to the device indicated by the transfer instruction, the transfer data converted into a data format permitting the image forming by the device indicated by the transfer instruction on the server.

2. A facsimile device comprising:
a facsimile data reception section receiving facsimile data from a different facsimile device;
a first storage section storing the facsimile data received by the facsimile data reception section;
a job management section performing management of a fax job for the facsimile data stored in the first storage section;
a transfer instruction reception section receiving, from a user, a transfer instruction for transferring the facsimile data of the fax job managed by the job management section to a different device;
a password creation section creating a password in correspondence with facsimile data targeted for transfer when the transfer instruction reception section has received the transfer instruction;
a data transfer section transferring, to the different device, transfer data including the password created by the password creation section and the facsimile data targeted for the transfer;
a data conversion section converting the transfer data into a predefined standard data format;
an advisability detection section detecting whether or not the device indicated by the transfer instruction is an image forming apparatus capable of image forming in the standard data format;
a data obtaining section;
a second storage section storing facsimile data acquired from the data obtaining section;
a data management section moving, to the second storage section, the facsimile data transferred to the different device by the data transfer section and excluded from the job management by the job management section; and
a delete instruction reception section receiving, from the user, a delete instruction by specification of the facsimile data targeted for deletion from among those stored in the second storage section and by password inputting;
when the delete instruction reception section has received the delete instruction, the data management section determines whether or not the facsimile data targeted for the deletion by the delete instruction is moved to the second storage section as a result of the movement, and if it is moved, compares a password indicated by the delete instruction with the password created in correspondence with the facsimile data targeted for the deletion, and deletes the facsimile data targeted for the deletion from the second storage section under condition that the passwords agree with each other;
wherein, when the advisability detection section has determined that the device indicated by the transfer instruction is the image forming apparatus capable of image forming in the standard data format, the data transfer section further performs transfer of the transfer data to the image forming apparatus in the standard data format, and when the advisability detection section has determined that the device is the image forming apparatus not capable of image forming in the standard data format, the data transfer section transmits the transfer data targeted for the transfer by the transfer instruction to a predefined server on the Internet, and transmits, from the server to the device indicated by the transfer instruction, the transfer data converted into a data format permitting the image forming by the device indicated by the transfer instruction on the server.

3. A facsimile device comprising:
a facsimile data reception section receiving facsimile data from a different facsimile device;
a first storage section storing the facsimile data received by the facsimile data reception section;
a job management section performing management of a fax job for the facsimile data stored in the first storage section;
a transfer instruction reception section receiving, from a user, a transfer instruction for transferring, to a different device, the facsimile data of the fax job managed by the job management section;
a password creation section creating a password in correspondence with the facsimile data targeted for transfer when the transfer instruction reception section has received the transfer instruction;
a data transfer section transferring, to the different device, transfer data including the password created by the password creation section and the facsimile data targeted for the transfer;
a data conversion section converting the transfer data into a predefined standard data format;
an advisability detection section detecting whether or not the device indicated by the transfer instruction is an image forming apparatus capable of image forming in the standard data format;
a second storage section storing the facsimile data transferred to the different device by the data transfer section and excluded from the job management by the job management section;
a data management section moving the facsimile data excluded from the job management to the second storage section; and
a delete instruction reception section receiving, from the user, a delete instruction by specification of the facsimile data from among those stored in the second storage section and by password inputting;
when the delete instruction reception section has received the delete instruction, the data management section compares a password indicated by the delete instruction with the password created in correspondence with the facsimile data targeted for the deletion, and deletes the facsimile data targeted for the deletion from the second storage section under condition that the passwords agree with each other;
wherein, when the advisability detection section has determined that the device indicated by the transfer instruction is the image forming apparatus capable of image forming in the standard data format, the data transfer section further performs transfer of the transfer data to the image forming apparatus in the standard data format, and when the advisability detection section has determined that the device is the image forming apparatus not capable of image forming in the standard data format, the data transfer section transmits the transfer data targeted for the transfer by the transfer instruction to a predefined server on the Internet, and transmits, from the server to the device indicated by the transfer instruction, the transfer data converted into a data format permitting the image forming by the device indicated by the transfer instruction on the server.

* * * * *